US012795530B2

(12) United States Patent
Li et al.

(10) Patent No.: US 12,795,530 B2
(45) Date of Patent: Nov. 10, 2026

(54) INFORMATION TRANSMISSION METHOD AND APPARATUS

(71) Applicant: HUAWEI TECHNOLOGIES CO., LTD., Shenzhen (CN)

(72) Inventors: Yongcui Li, Beijing (CN); Zehao Chen, Shenzhen (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 18/618,096

(22) Filed: Mar. 27, 2024

(65) Prior Publication Data

US 2024/0236840 A1 Jul. 11, 2024

Related U.S. Application Data

(63) Continuation of application No. PCT/CN2022/121186, filed on Sep. 26, 2022.

(30) Foreign Application Priority Data

Sep. 30, 2021 (CN) .......................... 202111163293.1

(51) Int. Cl.
*H04W 48/18* (2009.01)
*H04W 8/12* (2009.01)
(Continued)

(52) U.S. Cl.
CPC ............. *H04W 48/18* (2013.01); *H04W 8/12* (2013.01); *H04W 8/26* (2013.01); *H04W 48/08* (2013.01);
(Continued)

(58) Field of Classification Search
CPC ......... H04W 48/18; H04W 8/12; H04W 8/26; H04W 48/08; H04W 48/16; H04W 8/082; H04W 84/042; H04L 61/4511
See application file for complete search history.

(56) References Cited

U.S. PATENT DOCUMENTS

2019/0215904 A1* 7/2019 Wu ..................... H04W 12/069
2022/0263788 A1* 8/2022 Lee ..................... H04L 61/4511
(Continued)

FOREIGN PATENT DOCUMENTS

WO WO-2020001440 A1 * 1/2020 ............ H04W 36/00
WO 2021052080 A1 3/2021

OTHER PUBLICATIONS

Huawei et al., "New SID on Enhancement of support for Edge Computing in 5G Core network—phase 2," 3GPP TSG-SA2 Meeting #145E, S2-2104498, Electronic meeting, May 17-28, 2021, 4 pages.
(Continued)

*Primary Examiner* — Michael A Keller
*Assistant Examiner* — Chhian (Amy) Ling
(74) *Attorney, Agent, or Firm* — Fish & Richardson P.C.

(57) ABSTRACT

This application provides information transmission methods and apparatuses. In an example method, a first session management network element selects an edge application server discovery network element, where the first session management network element and the edge application server discovery network element are network elements deployed in a visited network. The first session management network element sends address information of the edge application server discovery network element.

20 Claims, 7 Drawing Sheets

300

(51) Int. Cl.

| | |
|---|---|
| ***H04W 8/26*** | (2009.01) |
| ***H04W 48/08*** | (2009.01) |
| ***H04W 48/16*** | (2009.01) |
| *H04L 61/4511* | (2022.01) |
| *H04W 8/08* | (2009.01) |
| *H04W 84/04* | (2009.01) |

(52) U.S. Cl.

CPC ......... *H04W 48/16* (2013.01); *H04L 61/4511* (2022.05); *H04W 8/082* (2013.01); *H04W 84/042* (2013.01)

(56) References Cited

U.S. PATENT DOCUMENTS

2023/0199595 A1* 6/2023 Lu .......................... H04W 36/12 370/329

2024/0244031 A1* 7/2024 Li .......................... H04W 12/06

OTHER PUBLICATIONS

3GPP TS 23.548 V2.0.0, "3rd Generation Partnership Project; Technical Specification Group Services and System Aspects; 5G System Enhancements for Edge Computing; Stage 2 (Release 17)," Sep. 2021, 52 pages.

3GPP TS 23.501 V17.2.0, "3rd Generation Partnership Project; Technical Specification Group Services and System Aspects; System architecture for the 5G System (5GS); Stage 2 (Release 17)," Sep. 2021, 542 pages.

3GPP TS 23.548 V17.0.0, "3rd Generation Partnership Project; Technical Specification Group Services and System Aspects; 5G System Enhancements for Edge Computing; Stage 2 (Release 17)," Sep. 2021, 52 pages.

International Search Report and Written Opinion in International Appln. No. PCT/CN2022/121186, mailed on Dec. 28, 2022, 20 pages (with English translation).

Office Action in India Appln. No. 2024-17029321, mailed on Apr. 16, 2026, 7 pages.

* cited by examiner

500

INFORMATION TRANSMISSION METHOD AND APPARATUS

CROSS-REFERENCE TO RELATED APPLICATIONS

This application is a continuation of International Application No. PCT/CN2022/121186, filed on Sep. 26, 2022, which claims priority to Chinese Patent Application No. 202111163293.1, filed on Sep. 30, 2021. The disclosures of the aforementioned applications are hereby incorporated by reference in their entireties.

TECHNICAL FIELD

This application relates to the communication field, and more specifically, to an information transmission method and apparatus.

BACKGROUND

In an edge computing (edge computing, EC) deployment scenario, some services may be provided by a plurality of edge application servers (edge application servers, EASs) deployed in a network edge. The plurality of EASs may provide same services and content, and most of the EASs have different internet protocol (internet protocol, IP) addresses. In the EC scenario, when user equipment (user equipment, UE) is required to access the service, the user equipment (user equipment, UE) is required to access an available EAS that is close to the UE. Therefore, an appropriate IP address of the EAS is important.

In some cases, the UE may leave a coverage area of a home public land mobile network (public land mobile network, PLMN) (home PLMN, HPLMN), and access a visited public land mobile network (visited PLMN, VPLMN) through home routed (home routed, HR) roaming, and the VPLMN provides a service for the UE.

SUMMARY

This application provides an information transmission method and apparatus, so that a service for roaming UE by using an edge application server discovery network element deployed in a VPLMN is provided. For example, the roaming UE can access an edge application service in the VPLMN.

According to a first aspect, an information transmission method is provided. The method may be performed by a core network element, or may be performed by a component (for example, a chip or a circuit) of the core network element. This is not limited. For ease of description, an example in which the method is performed by a first session management network element is used below for description.

The method may include: A first session management network element selects an edge application server discovery network element, where the first session management network element and the edge application server discovery network element are network elements deployed in a visited network; and the first session management network element sends address information of the edge application server discovery network element.

Based on the foregoing solution, the first session management network element deployed in the visited network may select the edge application server discovery network element, and send the address information of the edge application server discovery network element. In this way, after accessing the visited network through HR roaming, a terminal device may access a service in the visited network by using the edge application server discovery network element selected by the first session management network element. In addition, the edge application server discovery network element may be configured to assist in discovering an edge application server. Therefore, the first session management network element selects the edge application server discovery network element, to implement local traffic routing in the visited network. Specifically, for example, an address of the edge application server discovery network element selected by the first session management network element may be used as a termination point of a domain name system (domain name system, DNS) message. The edge application server discovery network element processes the DNS message, to implement the local traffic routing in the visited network, so that roaming UE can access an edge application service in the visited network.

That "an address of the edge application server discovery network element is used as a termination point of a DNS message" may indicate, for example, that the address of the edge application server discovery network element is used as a destination address of the DNS message, or that the DNS message is sent to the edge application server discovery network element, or that the edge application server discovery network element processes the DNS message.

With reference to the first aspect, in some implementations of the first aspect, that a first session management network element selects an edge application server discovery network element includes: The first session management network element selects the edge application server discovery network element based on indication information, where the indication information indicates that traffic routing is allowed in the visited network.

Based on the foregoing solution, if the indication information indicates that the traffic routing is allowed in the visited network, the first session management network element selects the edge application server discovery network element, so that the first session management network element may be enabled to select the edge application server discovery network element based on the indication information. This avoids, as far as possible, resource wastes caused because an operation of selecting the edge application server discovery network element is performed when the traffic routing in the visited network is prohibited.

With reference to the first aspect, in some implementations of the first aspect, the method further includes: The first session management network element receives the indication information from a second session management network element, where the second session management network element is a network element deployed in a home network; or the first session management network element locally configures the indication information.

Based on the foregoing solution, the first session management network element may locally configure the indication information, or may receive the indication information from another network element (for example, the second session management network element).

With reference to the first aspect, in some implementations of the first aspect, that the first session management network element sends address information of the edge application server discovery network element includes: The first session management network element sends the address information of the edge application server discovery network element to the terminal device.

Based on the foregoing solution, the first session management network element directly sends the address information of the selected edge application server discovery network element to the terminal device, so that the local traffic routing can be performed in the visited network, and signaling overheads caused by the first session management network element sending the address information of the selected edge application server discovery network element to another core network element, and then the another core network element sending the address information of the selected edge application server discovery network element to the terminal device can be reduced.

With reference to the first aspect, in some implementations of the first aspect, that the first session management network element sends address information of the edge application server discovery network element includes: The first session management network element sends the address information of the edge application server discovery network element to a second session management network element, where the second session management network element is the network element deployed in the home network.

Based on the foregoing solution, the first session management network element sends the address information of the selected edge application server discovery network element to the second session management network element, so that the local traffic routing can be performed in the visited network, and it may be further convenient for the second session management network element to process the address information of the edge application server discovery network element.

With reference to the first aspect, in some implementations of the first aspect, the method further includes: The first session management network element receives request information from the second session management network element, where the request information is used to request an address of the edge application server discovery network element, and the second session management network element is the network element deployed in the home network. That a first session management network element selects an edge application server discovery network element includes: In response to the request information, the first session management network element selects the edge application server discovery network element.

Based on the foregoing solution, after receiving a request of the second session management network element, the first session management network element may select the edge application server discovery network element.

According to a second aspect, an information transmission method is provided. The method may be performed by a core network element, or may be performed by a component (for example, a chip or a circuit) of the core network element. This is not limited. For ease of description, an example in which the method is performed by a second session management network element is used below for description.

The method may include: A second session management network element obtains address information of an edge application server discovery network element. The second session management network element sends the address information of the edge application server discovery network element to a terminal device, where the edge application server discovery network element is a network element deployed in a visited network, and the second session management network element is a network element deployed in a home network.

Based on the foregoing solution, the second session management network element deployed in the home network may obtain the edge application server discovery network element deployed in the visited network, and send the address information of the edge application server discovery network element to the terminal device. In this way, after accessing the visited network through HR roaming, the terminal device may access a service in the visited network by using the edge application server discovery network element. In addition, the edge application server discovery network element may be configured to assist in discovering an edge application server. Therefore, by using the edge application server discovery network element obtained by the second session management network element in the visited network, local traffic routing can be performed in the visited network. Specifically, for example, an address of the edge application server discovery network element may be used as a termination point of a DNS message. The edge application server discovery network element processes the DNS message, to implement the local traffic routing in the visited network, so that roaming UE can access an edge application service in the visited network.

With reference to the second aspect, in some implementations of the second aspect, that a second session management network element obtains address information of an edge application server discovery network element includes: The second session management network element receives the address information of the edge application server discovery network element from a first session management network element, where the first session management network element is a network element deployed in the visited network.

Based on the foregoing solution, the second session management network element may receive the address information of the edge application server discovery network element from the first session management network element.

With reference to the second aspect, in some implementations of the second aspect, the second session management network element sends first request information to the first session management network element, where the first request information is used to request an address of the edge application server discovery network element.

Based on the foregoing solution, the second session management network element may request the address information of the edge application server discovery network element from the first session management network element.

With reference to the second aspect, in some implementations of the second aspect, the method further includes: The second session management network element sends second request information to a network repository network element, where the second request information includes an identifier of the visited network, the second request information is used to request an address of the edge application server discovery network element, and the network repository network element is a network element deployed in the home network; and that a second session management network element obtains address information of an edge application server discovery network element includes: The second session management network element receives the address information of the edge application server discovery network element from the network repository network element.

Based on the foregoing solution, the second session management network element may request the address information of the edge application server discovery network element from the network repository network element.

With reference to the second aspect, in some implementations of the second aspect, the method further includes:

The second session management network element obtains indication information, where the indication information indicates that traffic routing is allowed in the visited network; and that a second session management network element obtains address information of an edge application server discovery network element includes: The second session management network element obtains the address information of the edge application server discovery network element based on the indication information.

Based on the foregoing solution, if the indication information indicates that the traffic routing is allowed in the visited network, the second session management network element selects the edge application server discovery network element, so that the second session management network element may be enabled to obtain the edge application server discovery network element based on the indication information. This avoids, as far as possible, resource wastes caused because an operation of obtaining the edge application server discovery network element is performed when the traffic routing in the visited network is prohibited.

With reference to the second aspect, in some implementations of the second aspect, the method further includes: The second session management network element obtains indication information, where the indication information indicates that traffic routing is allowed in the visited network; and that the second session management network element sends the address information of the edge application server discovery network element to a terminal device includes: The second session management network element sends the address information of the edge application server discovery network element to the terminal device based on the indication information.

Based on the foregoing solution, if the indication information indicates that the traffic routing is allowed in the visited network, the second session management network element sends the address information of the edge application server discovery network element to the terminal device, so that the second session management network element may be enabled to send the address information of the edge application server discovery network element to the terminal device based on the indication information. This avoids, as far as possible, resource wastes caused because an operation of sending the address information of the edge application server discovery network element to the terminal device is performed when the traffic routing in the visited network is prohibited.

With reference to the second aspect, in some implementations of the second aspect, the method further includes: The second session management network element sends the indication information to the first session management network element.

With reference to the second aspect, in some implementations of the second aspect, the method further includes: The second session management network element receives the indication information from a policy control network element, where the policy control network element is a network element deployed in the home network; or the second session management network element locally configures the indication information.

According to a third aspect, an information transmission method is provided. The method may be performed by a core network element, or may be performed by a component (for example, a chip or a circuit) of the core network element. This is not limited. For ease of description, an example in which the method is performed by a second session management network element is used below for description.

The method may include: The second session management network element obtains indication information, where the indication information indicates that traffic routing is allowed in a visited network; and the second session management network element sends the indication information to a first session management network element, where the first session management network element is a network element deployed in the visited network, and the second session management network element is a network element deployed in a home network.

Based on the foregoing solution, the second session management network element deployed in the home network sends the indication information to the first session management network element deployed in the visited network, where the indication information indicates that the traffic routing is allowed in the visited network. In this manner, the first session management network element deployed in the visited network may learn that the traffic routing in the visited network is allowed, so that the first session management network element can perform some operations, for example, select the edge application server discovery network element to access a service in the visited network.

With reference to the third aspect, in some implementations of the third aspect, the method further includes: The second session management network element receives address information of the edge application server discovery network element from the first session management network element.

With reference to the third aspect, in some implementations of the third aspect, the method further includes: The second session management network element sends the address information of the edge application server discovery network element to a terminal device.

With reference to the third aspect, in some implementations of the third aspect, that a second session management network element obtains indication information includes: The second session management network element receives the indication information from a policy control network element, where the policy control network element is a network element deployed in the home network.

For example, the policy control network element is a policy control network element deployed in the home network.

According to a fourth aspect, an information transmission method is provided. The method may be performed by a core network element, or may be performed by a component (for example, a chip or a circuit) of the core network element. This is not limited. For ease of description, an example in which the method is performed by a policy control network element is used below for description.

The method may include: The policy control network element obtains indication information, where the indication information indicates that traffic routing is allowed in a visited network; and the policy control network element sends the indication information to a second session management network element, where the second session management network element and the policy control network element are network elements deployed in a home network.

Based on the foregoing solution, the policy control network element deployed in the home network sends the indication information to the second session management network element deployed in the home network, where the indication information indicates that the traffic routing is allowed in the visited network. In this manner, the second session management network element deployed in the home network may learn that the traffic routing is allowed in the visited network, so that the second session management network element can perform some operations, for example, send, to a terminal device, the edge application server discovery network element deployed in the home network, to access a service in the visited network.

According to a fifth aspect, an information transmission apparatus is provided. The apparatus is configured to perform the method according to any one of the possible implementations of the first aspect to the fourth aspect. Specifically, the apparatus may include a unit and/or a module configured to perform the method according to any one of the possible implementations of the first aspect to the fourth aspect, for example, a processing unit and/or a communication unit.

In an implementation, the apparatus is a core network element. When the apparatus is the core network element, the communication unit may be a transceiver or an input/output interface, and the processing unit may be at least one processor. Optionally, the transceiver may be a transceiver circuit. Optionally, the input/output interface may be an input/output circuit.

In another implementation, the apparatus is a chip, a chip system, or a circuit used in the core network element. When the apparatus is the chip, the chip system, or the circuit used in the core network element, the communication unit may be an input/output interface, an interface circuit, an output circuit, an input circuit, a pin, a related circuit, or the like on the chip, the chip system, or the circuit. The processing unit may be at least one processor, a processing circuit, a logic circuit, or the like.

According to a sixth aspect, an information transmission apparatus is provided. The apparatus includes at least one processor, configured to execute a computer program or instructions stored in a memory, to perform the method according to any one of the possible implementations of the first aspect to the fourth aspect. Optionally, the apparatus further includes the memory, configured to store the computer program or the instructions. Optionally, the apparatus further includes a communication interface, and the processor reads, through the communication interface, the computer program or the instructions stored in the memory.

In an implementation, the apparatus is a core network element.

In another implementation, the apparatus is a chip, a chip system, or a circuit used in the core network element.

According to a seventh aspect, this application provides a processor, configured to perform the methods provided in the foregoing aspects.

Unless otherwise specified, or if operations such as sending and obtaining/receiving related to the processor do not contradict an actual function or internal logic of the operations in related descriptions, the operations may be understood as operations such as outputting, receiving, and inputting of the processor, or may be understood as sending and receiving operations performed by a radio frequency circuit and an antenna. This is not limited in this application.

According to an eighth aspect, a computer-readable storage medium is provided, where the computer-readable medium stores program code executed by a device, and the program code is for performing the method according to any one of the possible implementations of the first aspect to the fourth aspect.

According to a ninth aspect, a computer program product including instructions is provided. When the computer program product runs on a computer, the computer is enabled to perform the method according to any one of the possible implementations of the first aspect to the fourth aspect.

According to a tenth aspect, a communication system is provided, and includes one or more of the foregoing first session management network element, the foregoing second session management network element, the foregoing network repository network element, and the foregoing policy control network element.

DESCRIPTION OF EMBODIMENTS

The following describes technical solutions of this application with reference to the accompanying drawings.

The technical solutions provided in this application may be applied to various communication systems, for example, a 5th generation (5th generation, 5G) or new radio (new radio, NR) system, a long term evolution (long term evolution, LTE) system, and an LTE frequency division duplex (frequency division duplex, FDD) system, an LTE time division duplex (time division duplex, TDD) system, and the like. The technical solutions provided in this application may be further applied to a future communication system, for example, a 6th generation mobile communication system. The technical solutions provided in this application may be further applied to a device-to-device (device-to-device, D2D) communication, a vehicle-to-everything (vehicle-to-everything, V2X) communication, a machine-to-machine (machine to machine, M2M) communication, a machine type communication (machine type communication, MTC), and an internet of things (internet of things, IoT) communication system, or another communication system.

First, a network architecture applicable to this application is briefly described with reference to FIG. 1 and FIG. 2 below.

Figure 1:
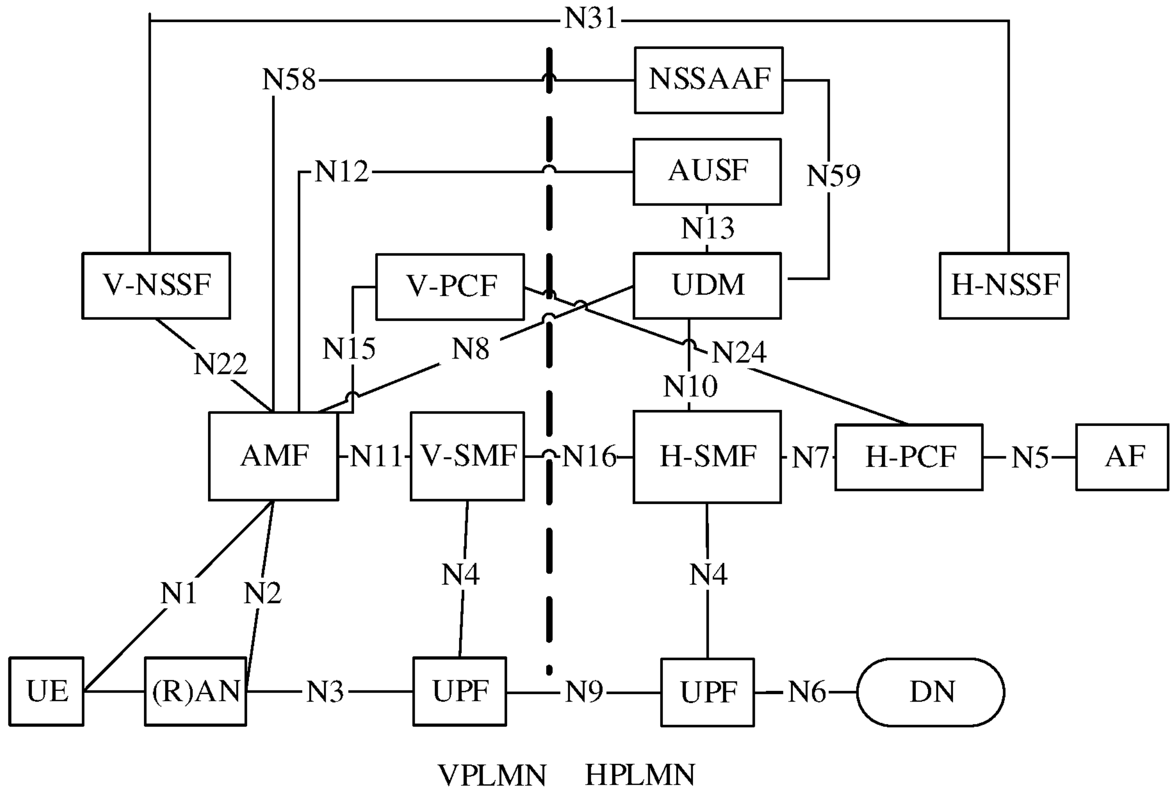
FIG. 1 is a schematic diagram of a network architecture.

In an example, FIG. 1 is a schematic diagram of a network architecture.

As shown in FIG. 1, the network architecture uses home routed (home routed, HR) roaming as an example.

A cellular mobile communication network of a standard of an operator may be referred to as a public land mobile network (public land mobile network, PLMN). A PLMN signed by user equipment (user equipment, UE) may be referred to as a home public land mobile network (public land mobile network, PLMN) (home PLMN, HPLMN), and represents a home operator of a subscriber. When the UE leaves a coverage area of the HPLMN due to movement or another reason, the UE may access a PLMN if the PLMN meets the following conditions: (1) The PLMN can cover a current location of the UE. (2) An operator of the PLMN and an operator of the HPLMN of the UE sign a roaming protocol (where the roaming protocol indicates a protocol between the operators, content may include, for example, but not limited to, problems such as a service and a charging manner provided for a subscriber of a network of a peer operator, and this is not limited). In addition, the PLMN may be referred to as a visited public land mobile network (visited PLMN, VPLMN). Behavior that the UE accesses the VPLMN may be referred to as roaming.

Roaming scenarios may include local breakout (local breakout, LBO) roaming and home routed (home routed, HR) roaming.

In the HR roaming scenario, the SMF in the HPLMN may receive a subscription permanent identifier (subscription permanent identifier, SUPI) of a terminal device from the SMF in the VPLMN. For the HR roaming scenario, refer to specifications in the protocol. This is not limited.

As shown in FIG. 1, the network architecture may include but not limited to: a network slice specific authentication and authorization function (network slice specific authentication and authorization function, NSSAAF), a network slice selection function (network slice selection function, NSSF), an authentication server function (authentication server function, AUSF), unified data management (unified data management, UDM), a policy control function (policy control function, PCF), an application function (application function, AF), an access and mobility management function (access and mobility management function, AMF), a session management function (session management function, SMF), the user equipment (user equipment, UE), a radio access network device, a user plane function (user plane function, UPF), a data network (data network, DN), and the like.

The following briefly describes each network element shown in FIG. 1.

1. UE may be referred to as a terminal device, an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data for a user, for example, a handheld device or a vehicle-mounted device that has a wireless connection function. Currently, some examples of the terminal are a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a wearable device, a terminal device in a 5G network, or a terminal device in a future evolved public land mobile network (public land mobile network, PLMN). This is not limited in embodiments of this application.

By way of example but not limitation, the terminal device in embodiments of this application may alternatively be a wearable device. The wearable device may also be referred to as a wearable intelligent device, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that dedicated to only one type of application function and need to collaboratively work with other devices such as smartphones, for example, various smart bands or smart jewelry for monitoring physical signs.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things.

It should be noted that the terminal device and the access network device may communicate with each other by using an air interface technology (for example, an NR technology or an LTE technology). The terminal devices may also communicate with each other by using an air interface technology (for example, the NR technology or the LTE technology).

In embodiments of this application, an apparatus configured to implement a function of the terminal device may be a terminal device, or may be an apparatus, for example, a chip system or a chip, that can support the terminal device in implementing the function. The apparatus may be installed in the terminal device. In embodiments of this application, the chip system may include a chip, or may include a chip and another discrete component.

2. The (radio) access network ((radio) access network, (R)AN) device may provide an authorized user in a specific area with a function of accessing a communication network, and may specifically include a wireless network device in a 3rd generation partnership project (3rd generation partnership project, 3GPP) network, or may include an access point in a non-3GPP (non-3GPP) network. For ease of description, the (radio) access network device is represented by using an AN device below.

The AN device may use different radio access technologies. Currently, there are two types of radio access technologies: a 3GPP access technology (for example, a radio access technology used in a 3rd generation (3rd generation, 3G) system, a 4th generation (4th generation, 4G) system, or a 5G system), and a non-3GPP (non-3GPP) access technology. The 3GPP access technology is an access technology that complies with a 3GPP standard specification. For example, an access network device in the 5G system is referred to as a next generation NodeB (next generation NodeB, gNB) or a RAN device. The non-3GPP access technology may include an air interface technology represented by an access point (access point, AP) in wireless fidelity (wireless fidelity, Wi-Fi), worldwide interoperability for microwave access (worldwide interoperability for microwave access, WiMAX), code division multiple access (code division multiple access, CDMA), and the like. The AN device may allow interconnection and interworking between the terminal device and a 3GPP core network by using the non-3GPP access technology.

The AN device can be responsible for functions such as radio resource management, quality of service (quality of service, QoS) management, and data compression and encryption on an air interface side. The AN device provides an access service for the terminal device, and further completes forwarding a control signal and user data between the terminal device and the core network.

The AN device may include, for example, but not limited to, a macro base station, a micro base station (also referred to as a small cell), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an AP in a Wi-Fi system, a wireless relay node, a wireless backhaul node, a transmission point (transmission point, TP), or a transmission and reception point (transmission and reception point, TRP). Alternatively, the AN device may be the gNB or a transmission point (a TRP or a TP) in the 5G (for example, NR) system, or one antenna panel or a group (including a plurality of antenna panels) of antenna panels of a base station in the 5G system. Alternatively, the AN device may be a network node constituting the gNB or a transmission point, for example, a distributed unit (distributed unit, DU), or a base station in a next generation 6G communication system. A specific technology and a specific device form that are used by the AN device are not limited in embodiments of this application.

3. The AMF is mainly configured for functions such as access control, mobility management, and attachment and detachment.

4. The SMF is mainly configured for user plane network element selection, user plane network element redirection, internet protocol (internet protocol, IP) address assignment of the terminal device, and session management in a mobile network, for example, session establishment, modification, and release, and quality of service (quality of service, QoS) control.

In this application, for differentiation, the SMF in the HPLMN is denoted as a home SMF (home SMF, H-SMF), and the SMF in the VPLMN is denoted as a visited SMF (visited SMF, V-SMF).

5. The UPF is mainly configured to receive and forward user plane data. For example, the UPF may receive the user plane data from the DN, and send the user plane data to the terminal device by using the AN device. Alternatively, the UPF may receive the user plane data from the terminal device by using the AN device, and forward the user data to the DN. In a session, a UPF that is directly connected to the DN through an N6 interface may be referred to as a protocol data unit (protocol data unit, PDU) session anchor (PDU session anchor, PSA).

In this application, for differentiation, a UPF in the HPLMN is denoted as a home UPF (home UPF, H-UPF), and a UPF in the VPLMN is denoted as a visited UPF (visited UPF, V-UPF).

In addition, for differentiation, a PSA in the HPLMN is denoted as a home PSA (home PSA, H-PSA), and a PSA in the VPLMN is denoted as a visited PSA (visited PSA, V-PSA) (or is denoted as a local PSA (local PSA, L-PSA)).

6. The PCF is mainly configured to: guide a unified policy framework of network behavior, and provide policy rule information and the like for a control plane network element (for example, the AMF or the SMF)

In this application, for differentiation, a PCF in the HPLMN is denoted as a home PCF (home PCF, H-PCF).

7. The AF is mainly configured to provide a service for the 3GPP network, for example, interact with the PCF to perform policy control.

8. The network slice selection function (network slice selection function, NSSF) is mainly configured to select a network slice.

9. The UDM is mainly configured for subscription data management of the UE, including storage and management of a UE identifier, access authorization of the UE, and the like.

10. The DN is mainly an operator network that provides a data service for the UE, for example, an internet (internet), a third-party service network, or an IP multimedia service (IP multi-media service, IMS) network.

11. The AUSF is mainly configured for user authentication, and the like.

Figure 2:
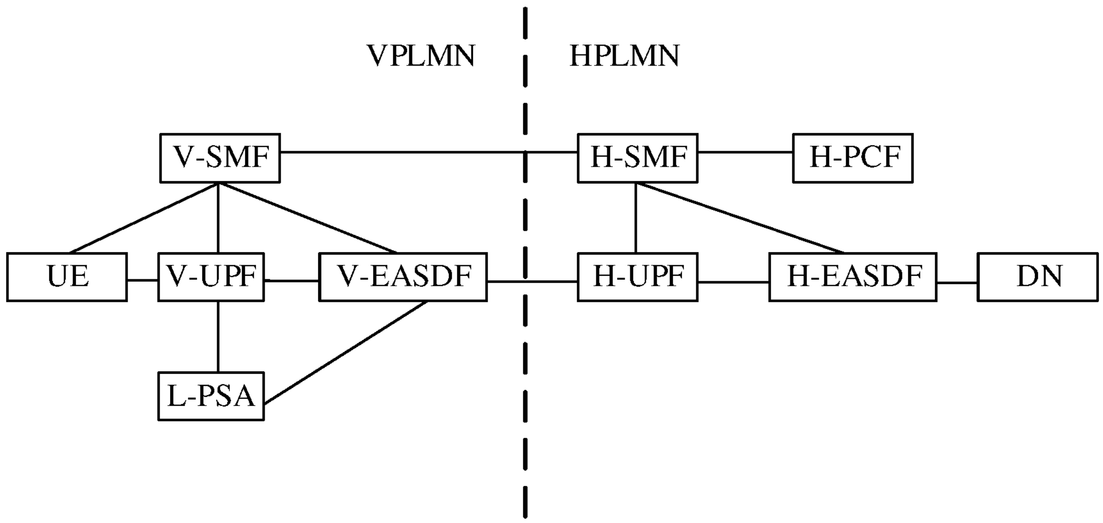
FIG. 2 is a schematic diagram of another network architecture.

In an example, FIG. 2 is a schematic diagram of another network architecture.

As shown in FIG. 2, the network architecture may be understood as an enhancement of the HR roaming architecture shown in FIG. 1. The network architecture may include but is not limited to the SMF (such as the V-SMF and the H-SMF), the UE, the UPF (such as the V-UPF and the H-UPF), the PSA (such as the L-PSA), the DN, the PCF (such as the H-PCF), an edge application server discovery network element (edge application server discovery function, EASDF) (for example, an EASDF in the HPLMN, denoted as a home EASDF (home SMF, H-EASDF), and an EASDF in the VPLMN, denoted as a visited EASDF (visited EASDF, V-EASDF)). In this architecture, a domain name system (domain name system, DNS) message may be terminated at the EASDF in the VPLMN.

The edge application server discovery network element, for example, may also be referred to as an edge application (service) discovery function, an application instance discovery function, an edge application instance discovery function, an MEC application (server) discovery function, or the like. This is not limited.

In the network architecture shown in FIG. 1 or FIG. 2, the network elements may communicate with each other through interfaces. For example, the UE is connected to the AN device by using a radio resource control (radio resource control, RRC) protocol, and the UE communicates with the AN device through a Uu interface. Alternatively, for details, refer to interfaces shown in FIG. 1. The details are not described herein again.

It should be understood that the foregoing network architecture is merely an example for description, and a network architecture applicable to embodiments of this application is not limited thereto. Any network architecture that can implement the functions of the foregoing network elements is applicable to embodiments of this application. In addition, the foregoing network architecture may further include more other network elements, for example, a network repository function (network function (NF) repository function, NRF) network element. This is not limited. In this application, for differentiation, an NRF in the HPLMN is denoted as a home NRF (home NRF, H-NRF), and an NRF in the VPLMN is denoted as a visited NRF (visited NRF, V-NRF).

It should be further understood that functions or network elements such as the AMF, the SMF, the UPF, the PCF, the UDM, the NSSF, and the AUSF shown in FIG. 1 or FIG. 2 may be understood as network elements configured to implement different functions, for example, may be combined into a network slice as required. These network elements may be independent devices, may be integrated into a same device to implement different functions, may be network elements in a hardware device, may be software functions running on dedicated hardware, or may be virtualization functions instantiated on a platform (for example, a cloud platform). Specific forms of the foregoing network elements are not limited in this application.

It should be further understood that the foregoing names are defined merely for distinguishing between different functions, and should not constitute any limitation on this application. This application does not exclude a possibility of using other names in a 6G network and another future network. For example, in the 6G network, some or all of the foregoing network elements may still use terms in 5G, or may use other names.

In an edge computing (edge computing, EC) deployment scenario, some services may be provided by a plurality of edge application servers (edge application servers, EASs) deployed in a network edge. The plurality of EASs may provide a same service and same content, and most of the EASs have different IP addresses. In the EC scenario, when UE accesses the service, the UE is requested to access an available EAS that is close to the UE. Therefore, it is important to obtain an IP address of an appropriate EAS.

As described above, the UE may access the VPLMN through HR roaming, and the VPLMN provides a service for the UE.

It is considered that when the UE accesses the VPLMN, some services may expect to access the VPLMN through EC. Currently, for the UE of HR roaming, in a PDU session establishment phase, only related information (for example, address information of the edge application server discovery network element in the HPLMN) about the HPLMN is provided to the UE. Consequently, an edge application server located in the VPLMN cannot be discovered for the UE. In this case, an existing edge service discovery mechanism cannot be used in the HR roaming scenario. Therefore, according to this application, local traffic routing may be performed in the VPLMN.

An EASDF is configured to assist in discovering an EAS. For example, a function of the EASDF includes processing a DNS message according to an indication of the SMF. Processing the DNS message may include but is not limited to: reporting the DNS message to the SMF, adding an EDNS-client-subnet option (EDNS-client-subnet option, ECS option) to a DNS query (DNS query), forwarding the DNS query to a DNS server, forwarding a DNS response (DNS response) to the UE, and the like. The EDNS is an extended mechanism for DNS (extended mechanism for DNS, EDNS).

In view of this, in this application, a service is provided for the roaming UE by using the edge application server discovery network element deployed in the VPLMN, to enable the roaming UE to access the edge application service in the VPLMN.

For example, a session management network element (for example, the V-SMF) in the VPLMN may select the V-EASDF, and send an address of the V-EASDF to the UE or to the H-SMF. In this way, the V-EASDF selected by the session management network element (for example, the V-SMF) in the VPLMN may be implemented as a termination point of the DNS message. For example, the V-EASDF processes a DNS query message from the terminal device, or the V-EASDF receives the DNS query message from the terminal device, or a destination address of the DNS query message from the terminal device may be the address of the V-EASDF, or the like. In this way, the V-SMF is enabled to obtain address information of a local EAS, to implement local traffic routing in the VPLMN.

For another example, a session management network element (for example, the H-SMF) in the HPLMN may obtain the V-EASDF, and send an address of the V-EASDF to the UE. In this way, the V-EASDF obtained by the session management network element (for example, the H-SMF) in the HPLMN may be implemented as the termination point of the DNS message. For example, the V-EASDF processes the DNS query message from the terminal device, or the V-EASDF receives the DNS query message from the terminal device, or the destination address of the DNS query message from the terminal device may be the address of the V-EASDF, or the like. In this way, the H-SMF is enabled to obtain the address information of the local EAS, to implement local traffic routing in the VPLMN.

Therefore, this application may be used to resolve edge service discovery in the roaming scenario (for example, in the HR roaming scenario).

It may be understood that the term "and/or" in this specification merely describes an association relationship for describing associated objects, and indicates that three relationships may exist. For example, A and/or B may indicate the following three cases: Only A exists, both A and B exist, and only B exists. In addition, the character "/" in this specification generally indicates an "or" relationship between the associated objects.

The following describes in detail an information transmission method provided in embodiments of this application with reference to the accompanying drawings. Embodiments provided in this application may be applied to the network architecture shown in FIG. 1 or FIG. 2. This is not limited.

Figure 3:
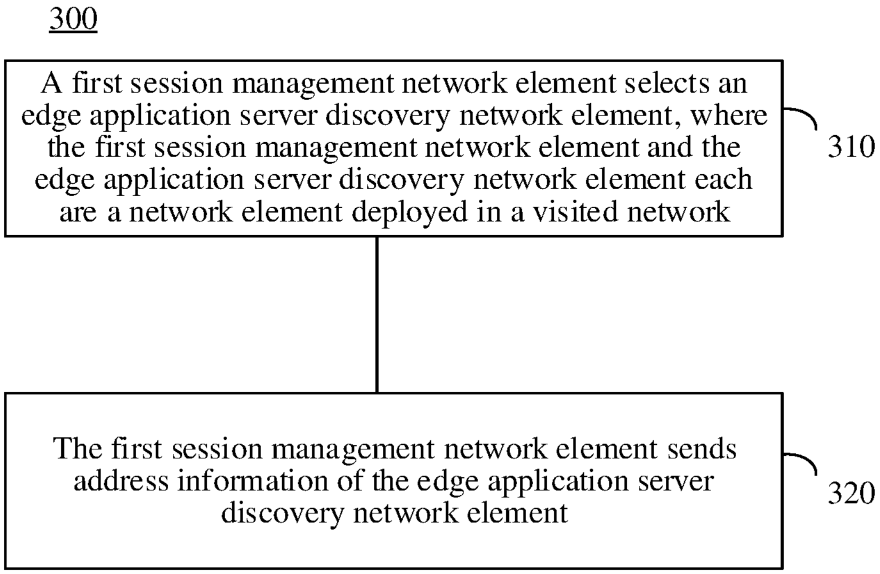
FIG. 3 is a schematic diagram of an information transmission method 300 according to an embodiment of this application.

FIG. 3 is a schematic diagram of an information transmission method 300 according to an embodiment of this application. The method 300 may include the following steps.

310: A first session management network element selects an edge application server discovery network element, where the first session management network element and the edge application server discovery network element are network elements deployed in a visited network.

The visited network is a network accessed by a terminal device after the terminal device leaves a home network. The visited network is, for example, a VPLMN. The following mainly uses the VPLMN as an example for description.

The first session management network element is a network element deployed in the VPLMN. For example, the first session management network element is a V-SMF.

The edge application server discovery network element is a network element deployed in the VPLMN. For example, the edge application server discovery network element is a V-EASDF. The following mainly uses the V-EASDF as an example for description.

320: The first session management network element sends address information of the edge application server discovery network element.

Based on the foregoing solution, the first session management network element deployed in the visited network may select the edge application server discovery network element (for example, the V-EASDF), and send the address information of the edge application server discovery network element. In this way, after accessing the visited network through HR roaming, the terminal device may access a service in the visited network by using the edge application server discovery network element selected by the first session management network element. In addition, the edge application server discovery network element may be configured to assist in discovering an EAS. Therefore, the first session management network element selects the edge application server discovery network element, and local traffic routing can be performed in the visited network. Specifically, for example, an address of the edge application server discovery network element selected by the first session management network element may be used as a termination point of a DNS message. The edge application server discovery network element processes the DNS message, so that the first session management network element is enabled to obtain address information of a local EAS, to implement local traffic routing in the visited network, so that roaming UE can access an edge application service in the visited network.

That "an address of the edge application server discovery network element is used as a termination point of a DNS message" may indicate, for example, that the address of the edge application server discovery network element is used as a destination address of the DNS message, or that the DNS message is sent to the edge application server discovery network element, or that the edge application server discovery network element processes the DNS message. This is not described below.

In step 310, the first session management network element may select the V-EASDF in at least any one of the following manners.

Manner 1: The first session management network element selects the V-EASDF based on indication information (denoted as indication information #A for differentiation).

The indication information #A indicates that the traffic routing is allowed in the VPLMN. That "the traffic routing in the VPLMN is allowed" may be understood as that the EASDF (that is, the V-EASDF) in the VPLMN is allowed to be used, or that a user plane in the VPLMN is allowed to be used, to process a service flow.

For example, the indication information #A may be used to trigger the first session management network element to select the V-EASDF. Specifically, if the first session management network element learns, based on the indication information #A, that the traffic routing is allowed in the VPLMN, the first session management network element may select the V-EASDF.

In this application, the indication information #A is mentioned for a plurality of times, and that the indication information #A indicates (represents or indicates) that traffic routing is allowed (or authorized) in the VPLMN may be described as that the indication information #A indicates that local traffic routing is allowed in the VPLMN, or may be described as that the indication information #A indicates that traffic routing is allowed. That local traffic routing that is allowed in the VPLMN is used as an example for description in the following specification.

For example, that local traffic routing is allowed in the VPLMN may indicate that an HPLMN allows local traffic routing in the VPLMN. Correspondingly, that the indication information #A indicates that local traffic routing is allowed in the VPLMN may be replaced with the following description: The indication information #A indicates that the V-EASDF is allowed (or authorized) to be used.

For another example, that local traffic routing is allowed in the VPLMN may indicate that the VPLMN is allowed to select the V-EASDF. Correspondingly, that the indication information #A indicates that local traffic routing is allowed in the VPLMN may be replaced with the following description: The indication information #A indicates that the V-EASDF is allowed (or authorized) to be selected.

For another example, that local traffic routing is allowed in the VPLMN may indicate that the address of the V-EASDF is allowed to be sent. Correspondingly, that the indication information #A indicates that local traffic routing is allowed in the VPLMN may be replaced with the following description: The indication information #A indicates that the address of the V-EASDF is allowed (or authorized) to be sent.

It may be understood that this application is mainly described by using an example in which local traffic routing is allowed in the VPLMN, and that local traffic routing in the VPLMN in all cases is not limited. In other words, in some cases, local traffic routing in the VPLMN may be prohibited (or not allowed). In this case, local traffic routing may not be performed in the VPLMN.

A specific name of the indication information #A is not limited in this application. For example, "indication information #A" in this application may be replaced with an "authorization policy", may be replaced with an "traffic routing policy", may be replaced with a "roaming policy", or the like.

A form of the indication information #A is not limited in this application. For example, the indication information #A may be an information element, a parameter, or text content recorded in a protocol.

Manner 2: The first session management network element selects the V-EASDF based on request information (denoted as request information #1 for differentiation) from a second session management network element.

The second session management network element is a network element deployed in the home network. For example, the second session management network element is an H-SMF.

Specifically, the second session management network element sends the request information #1 to the first session management network element, and in response to the request information #1, the first session management network element selects the V-EASDF.

The request information #1 is used to request (or is used to obtain) the address of the V-EASDF. The implementation of the request information #1 is not limited.

For example, the request information #1 may be used to trigger the first session management network element to select the V-EASDF. Specifically, if the first session management network element receives the request information #1, in response to the request information #1, the first session management network element selects the V-EASDF. In this case, the request information #1 may also be the indication information #A.

For another example, the request information #1 may be implemented by using one or more bits. For example, it is assumed that one bit indicates whether the first session management network element selects the V-EASDF. If the bit is set to "0", it indicates that the first session management network element selects the V-EASDF. If the bit is set to "1", it indicates that the first session management network element does not need to select the V-EASDF. For example, if the first session management network element receives signaling, the signaling includes the request information #1, and a bit corresponding to the request information #1 is set to "0", in response to the request information #1, the first session management network element selects the V-EASDF. It should be understood that the foregoing description is merely an example. This is not limited. In this case, for example, the request information #1 may be carried on interface signaling between the first session management network element and the second session management network element. For example, the signaling may be an Nsmf interface PDU session update request (Nsmf_PDUSession_Update Request) message, an Nsmf interface PDU session context request (Nsmf_PDUSession_Context Request) message, or the like. This is not limited in this application.

Manner 3: The first session management network element selects the V-EASDF based on internal logic implementation.

For example, the internal logic of the first session management network element indicates that the V-EASDF is selected after the first session management network element receives a session establishment request message. In this example, if the first session management network element receives the session establishment request message, the first session management network element selects the V-EASDF.

For example, the session establishment request message may be an Nsmf interface PDU session establishment session context request (Nsmf_PDUSession_CreateSMContext Request) message sent by an AMF to the first session management network element. This is not limited in this application.

It may be understood that the foregoing three manners are examples for description. This application is not limited thereto.

Optionally, the method 300 further includes: The first session management network element obtains the indication information #A.

The first session management network element may obtain the indication information #A in at least any one of the following manners.

Manner 1: The first session management network element receives the indication information #A from the second session management network element.

For example, the first session management network element is the V-SMF, and the second session management network element is the H-SMF. The H-SMF sends the indication information #A to the V-SMF. Correspondingly, the V-SMF receives the indication information #A from the H-SMF.

Manner 2: The first session management network element locally configures the indication information #A.

For example, a locally configured roaming protocol includes the indication information #A corresponding to the HPLMN, and the first session management network element directly obtains, based on the locally configured roaming protocol, the indication information #A corresponding to the HPLMN.

For another example, the locally configured roaming protocol includes one or more pieces of indication information #A, and the first session management network element obtains the indication information #A according to the locally configured roaming protocol. The one or more pieces of indication information #A may be indication information #A corresponding to one or more PLMNs. The first session management network element may first determine the HPLMN, and then obtain the corresponding indication information #A based on the HPLMN. For example, the indication information #A may exist in the first session management network element in a form of Table 1.

TABLE 1

| PLMN identifier (identifier, ID) | Indication information #A |
|---|---|
| PLMN #1 | Indication information #A1 |
| PLMN #2 | Indication information #A2 |
| PLMN #3 | Indication information #A3 |

Table 1 is used as an example. In a possible case, the PLMN ID may be an ID of the HPLMN, and indication information #Ai (i=1, 2, 3, . . . ), and the PLMN ID indicates whether the HPLMN allows local traffic routing in the VPLMN. For example, if the first session management network element determines that the HPLMN is the PLMN #1, the first session management network element may learn that the indication information #A corresponding to the HPLMN is the indication information #A1. If the indication information #A1 indicates that the PLMN #1 allows local traffic routing in the VPLMN, local traffic routing may be performed in the VPLMN.

A manner in which the first session management network element determines the HPLMN is not limited in this application. In an example, the first session management network element may identify the HPLMN based on an identifier (for example, an identifier of the second session management network element or an identifier of another network element) of a network element deployed in the HPLMN. In a possible manner, the first session management network element receives the identifier (for example, an H-SMF ID, which is not limited in this application) of the second session management network element from the AMF. The first session management network element determines the identifier of the HPLMN based on the identifier of the second session management network element, that is, determines the HPLMN.

It should be understood that Table 1 is merely an example for description. This is not limited. Any variation that belongs to Table 1 is applicable to this application. For example, the PLMN ID in Table 1 may alternatively be replaced with an SMF ID. For example, the PLMN #1 may be replaced with one or more SMF IDs (namely, an ID of one or more SMFs corresponding to the PLMN #1).

The foregoing two manners are examples for description. Any manner in which the first session management network element can obtain the indication information #A is applicable to this embodiment of this application.

In step 320, that the first session management network element sends the address information of the V-EASDF may include at least the following implementations.

Implementation 1: The first session management network element sends the address of the V-EASDF to the terminal device.

In this implementation, if an available V-EASDF exists in the VPLMN, the first session management network element selects the V-EASDF, and directly sends the address of the V-EASDF to the terminal device, so that the V-EASDF can be used as the termination point of the DNS message, to implement local traffic routing in the VPLMN.

In a possible case, the first session management network element sends the address of the V-EASDF to the terminal device based on the indication information #A. Specifically, if the indication information #A indicates that local traffic routing is allowed in the VPLMN, the first session management network element sends the address of the V-EASDF to the terminal device.

Implementation 2: The first session management network element sends the address of the V-EASDF to the second session management network element.

In this implementation, if an available V-EASDF exists in the VPLMN, the first session management network element selects the V-EASDF, and sends the address of the V-EASDF to the second session management network element, so that the second session management network element may perform processing. For example, the second session management network element may send the address of the V-EASDF to the terminal device, so that the V-EASDF can be used as the termination point of the DNS message, to implement local traffic routing in the VPLMN.

In a possible case, the first session management network element sends the address of the V-EASDF to the second session management network element based on the indication information #A. Specifically, if the indication information #A indicates that local traffic routing is allowed in the VPLMN, the first session management network element sends the address of the V-EASDF to the second session management network element.

In another possible case, the first session management network element sends the address of the V-EASDF to the terminal device based on the request information #1 from the second session management network element. Specifically, the second session management network element sends the request information #1 to the first session management network element, to request the address of the V-EASDF. The first session management network element selects the V-EASDF, and sends a response of the request information #1 to the second session management network element, where the response carries the address of the V-EASDF.

Figure 4:
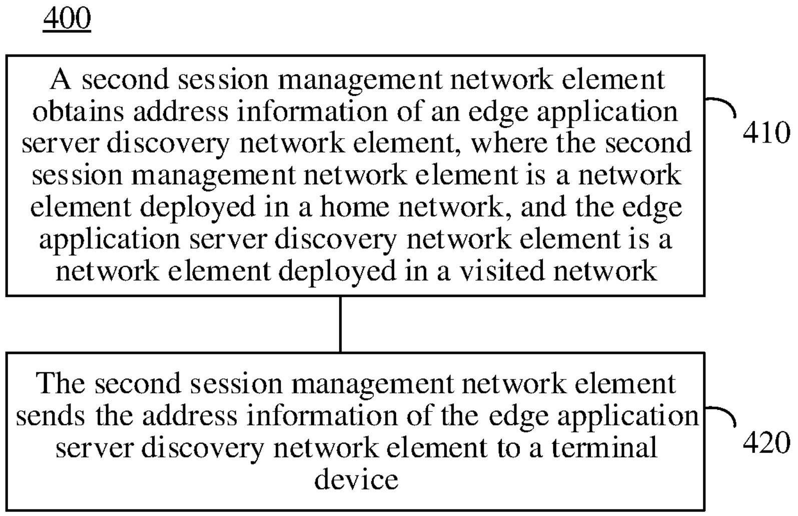
FIG. 4 is a schematic diagram of another information transmission method 400 according to an embodiment of this application.

FIG. 4 is a schematic diagram of another information transmission method 400 according to an embodiment of this application. The method 400 may include the following steps.

410: A second session management network element obtains address information of an edge application server discovery network element, where the second session management network element is a network element deployed in a home network, and the edge application server discovery network element is a network element deployed in a visited network.

The visited network is, for example, a VPLMN. The home network is a network to which a terminal device subscribes, for example, an HPLMN. The following mainly uses the HPLMN as an example for description.

The second session management network element is a network element deployed in the HPLMN. For example, the second session management network element is an H-SMF.

The edge application server discovery network element is a network element deployed in the VPLMN, for example, a V-EASDF.

420: The second session management network element sends the address information of the edge application server discovery network element to the terminal device.

Based on the foregoing solution, the second session management network element deployed in the home network may obtain the edge application server discovery network element (for example, the V-EASDF) deployed in the visited network, and send the address information of the edge application server discovery network element to the terminal device. In this way, after accessing the visited network through HR roaming, the terminal device may access a service in the visited network by using the edge application server discovery network element. In addition, the edge application server discovery network element may be configured to assist in discovering an EAS. Therefore, by using the edge application server discovery network element obtained by the second session management network element in the visited network, local traffic routing can be performed in the visited network. Specifically, for example, an address of the edge application server discovery network element may be used as a termination point of a DNS message. The edge application server discovery network element processes the DNS message, to implement local traffic routing in the visited network, so that roaming UE can access an edge application service in the visited network.

Optionally, in step 410, the second session management network element may obtain the address information of the V-EASDF in at least any one of the following manners.

Manner 1: The second session management network element obtains the address information of the V-EASDF from a first session management network element.

The first session management network element is a network element deployed in the visited network. For example, the first session management network element is a V-SMF.

In a possible case, the method 400 may further include: The second session management network element sends request information #1 to the first session management network element, where the request information #1 is used to request an address of the V-EASDF. The first session management network element sends a response of the request information #1 to the second session management network element, where the response carries the address information of the V-EASDF.

For the request information #1 and a manner in which the first session management network element obtains the V-EASDF, refer to the descriptions in the method 300. Details are not described herein again.

Manner 2: The second session management network element receives the address information of the V-EASDF from a network repository network element.

The network repository network element is a network element deployed in the home network. For example, the network repository network element is an H-NRF.

In a possible case, the method 400 may further include: The second session management network element sends request information #2 to the network repository network element, where the request information #2 is used to request the address of the V-EASDF. The network repository network element sends a response of the request information #2 to the second session management network element, where the response carries the address information of the V-EASDF.

A manner in which the network repository network element obtains the address of the V-EASDF is not limited. For example, the network repository network element locally configures the V-EASDF. For example, after receiving the request information #2 from the second session management network element, the network repository network element locally reads the address information of the V-EASDF, and sends the address information of the V-EASDF to the second session management network element. For another example, the network repository network element requests the V-EASDF from another core network element (for example, a V-NRF). For example, after receiving the request information #2 from the second session management network element, the network repository network element requests the V-EASDF from the V-NRF, receives the address information of the V-EASDF from the V-NRF, and sends the address information of the V-EASDF to the second session management network element.

Optionally, the method 400 further includes: The second session management network element obtains indication information #A.

For descriptions of the indication information #A, refer to the descriptions in the method 300. Details are not described herein again.

The second session management network element may obtain the indication information #A in at least any one of the following manners.

Manner 1: The second session management network element receives the indication information #A.

For example, the second session management network element receives the information #A from a policy control network element, where the policy control network element is a network element deployed in the home network. For example, the second session management network element is an H-SMF, and the policy control network element is an H-PCF. The H-PCF sends the indication information #A to the H-SMF. Correspondingly, the H-SMF receives the indication information #A from the H-PCF. A condition for triggering the H-PCF to send the indication information #A to the H-SMF is not limited. For example, the trigger condition may be that the H-SMF sends an identifier of the VPLMN to the H-PCF.

For another example, the second session management network element receives the information #A from the network repository network element, where the network repository network element is the network element deployed in the home network. For example, the second session management network element is an H-SMF, and the policy control network element is an H-NRF. The H-NRF sends the indication information #A to the H-SMF. Correspondingly, the H-SMF receives the indication information #A from the H-NRF. A condition for triggering the H-NRF to send the indication information #A to the H-SMF is not limited. For example, the trigger condition may be that the H-SMF sends the identifier of the VPLMN to the H-NRF. The following provides examples with reference to FIG. 5 to FIG. 8.

Manner 2: The second session management network element locally configures the indication information #A.

For example, a locally configured roaming protocol includes the indication information #A corresponding to the VPLMN, and the second session management network element directly obtains the indication information #A corresponding to the VPLMN according to the locally configured roaming protocol.

For another example, the locally configured roaming protocol includes one or more pieces of indication information #A, and the second session management network element obtains the indication information #A according to the locally configured roaming protocol. The one or more pieces of indication information #A may be indication information #A corresponding to one or more PLMNs. The second session management network element may first determine the VPLMN, and then obtain the corresponding indication information #A based on the VPLMN. It should be noted that the second session management network element may determine the indication information #A based on a message received from the first session management network element and local configuration. The message may be an Nsmf_PDUSession_Create Request message, an Nsmf_PDUSession_Update Request message, or the like. This is not limited in this application.

The indication information #A may exist in the second session management network element in a form of Table 2.

TABLE 2

| PLMN ID | Indication information #A |
|---|---|
| PLMN #1' | Indication information #A1' |
| PLMN #2' | Indication information #A2' |
| PLMN #3' | Indication information #A3' |

Table 2 is used as an example. In a possible case, the PLMN ID may be an ID of the VPLMN, and indication information #Aj' (j=1, 2, 3, . . . ), and the PLMN ID indicates whether local traffic routing is allowed in the VPLMN. For example, if the second session management network element determines that the VPLMN is the PLMN #2, the second session management network element may learn that the indication information #A corresponding to the VPLMN is the indication information #A2'. If the indication information #A2' indicates that local traffic routing is allowed in the PLMN #2', local traffic routing may be performed in the VPLMN.

A manner in which the second session management network element determines the VPLMN is not limited in this application. In an example, the second session management network element may identify the VPLMN based on an identifier of a network element deployed in the VPLMN (for example, an identifier of the first session management network element or an identifier of another network element). In a possible manner, the second session management network element receives the identifier of the first session management network element (for example, a V-SMF ID, and this is not limited in this application). The second session management network element determines the identifier of the VPLMN, that is, determines the VPLMN based on the identifier of the first session management network element. In another possible manner, the second session management network element receives the identifier of the VPLMN from the first session management network element. In still another possible manner, the second session management network element receives a message from the first session management network element, and determines the identifier of the VPLMN based on the message. The message may be an Nsmf_PDUSession_Create Request message, an Nsmf_PDUSession_Update Request message, or the like. This is not limited in this application.

It should be understood that Table 2 is merely an example for description. This is not limited. Any variation that belongs to Table 2 is applicable to this application. For example, the PLMN ID in Table 2 may also be replaced with an SMF ID. For example, the PLMN #1' may be replaced with one or more SMF IDs (namely, an ID of one or more SMFs corresponding to the PLMN' #1).

The foregoing two manners are examples for description. Any manner in which the second session management network element can obtain the indication information #A is applicable to this embodiment of this application.

In a possible case, that the second session management network element obtains the address information of the V-EASDF in step 410 may include: The second session management network element obtains the address information of the V-EASDF based on the indication information #A.

Specifically, if the second session management network element obtains the indication information #A, and learns, based on the indication information #A, that local traffic routing in the VPLMN is allowed to be performed. In this case, the second session management network element obtains the address information of the V-EASDF based on the indication information #A. In a possible example, the H-SMF obtains the indication information #A, and learns, based on the indication information #A, that local traffic routing in the VPLMN is allowed to be performed. In this case, the H-SMF sends a request message #1 to the V-SMF based on the indication information #A, and receives the address information of the V-EASDF from the V-SMF. Alternatively, in another possible example, the H-SMF obtains the indication information #A, and learns, based on the indication information #A, that local traffic routing in the VPLMN is allowed to be performed. In this case, the H-SMF sends a request message #2 to the H-NRF based on the indication information #A, and receives the address information of the V-EASDF from the H-NRF.

In another possible case, that the second session management network element sends the address information of the V-EASDF to the terminal device in step 420 may include: The second session management network element sends the address information of the V-EASDF to the terminal device based on the indication information #A.

Specifically, if the second session management network element obtains the indication information #A, and learns, based on the indication information #A, that local traffic routing in the VPLMN is allowed to be performed. In this case, the second session management network element sends the address information of the V-EASDF to the terminal device based on the indication information #A.

For ease of understanding, the following uses example descriptions of embodiments of this application with reference to FIG. 5 to FIG. 8. In the following examples, it is assumed that a first session management network element is a V-SMF, a second session management network element is an H-SMF, a network repository network element is an H-NRF, a policy control network element is an H-PCF, and indication information #A is an authorization policy. For details about related steps, refer to the foregoing descriptions.

Figure 5:
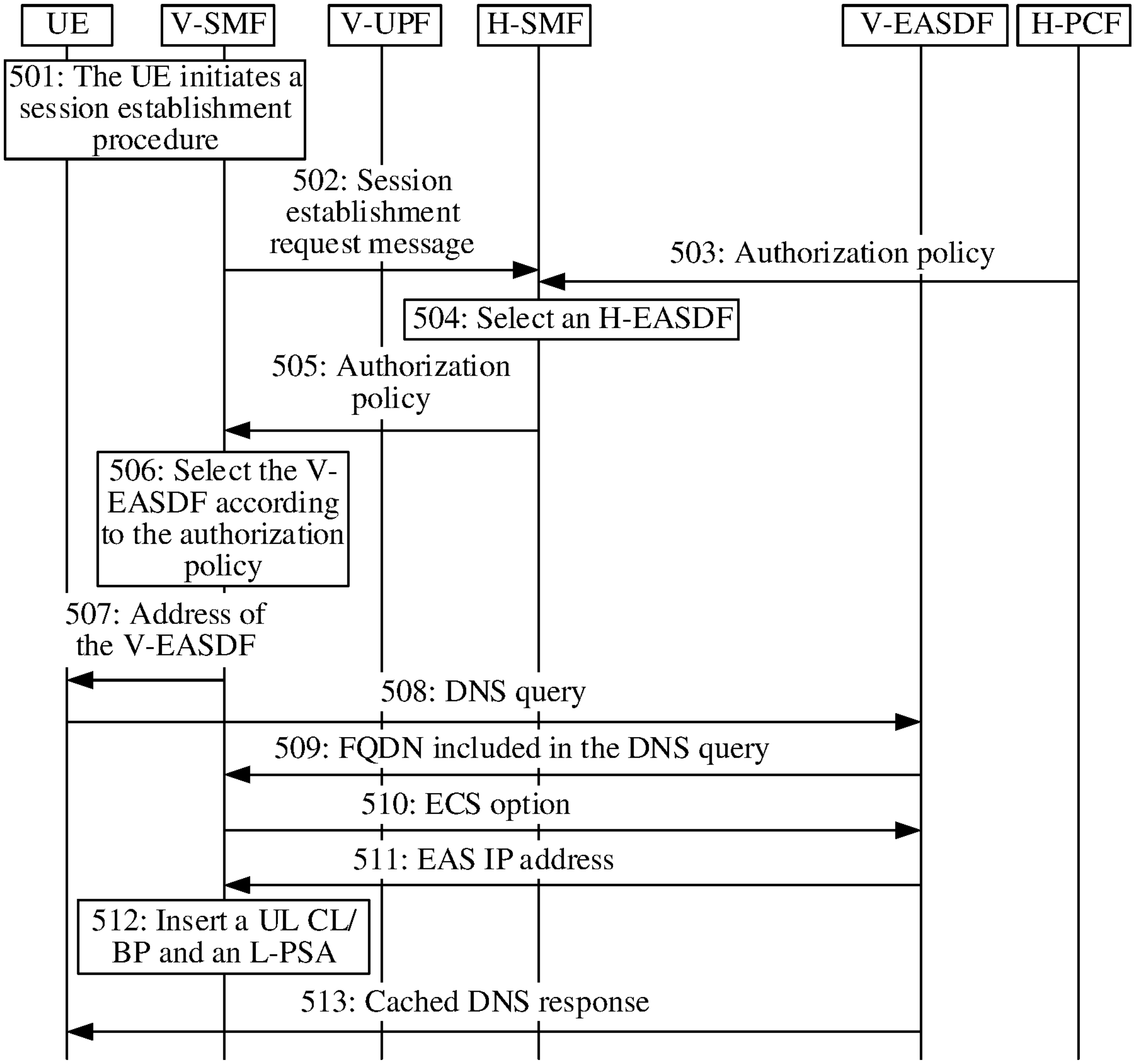
FIG. 5 is a schematic flowchart of an information transmission method 500 according to an embodiment of this application.

FIG. 5 is a schematic flowchart of an information transmission method 500 according to an embodiment of this application. The method 500 may be used in a scenario in which a V-SMF directly sends an address of a V-EASDF to UE. The method 500 may include the following steps.

501: The UE initiates a session establishment procedure.

In an HR roaming scenario, the UE may initiate an HR session establishment procedure. A specific session establishment procedure is not limited in this application. For example, the following manner may be used: After receiving a session establishment request of the UE, an AMF selects a V-SMF and an H-SMF that serve an HR session. After receiving the session establishment request, the V-SMF and the H-SMF respectively select a V-UPF and an H-UPF that serve the HR session, create an N4 session, and send user plane tunnel information. If the session is successfully established, a network side returns a session establishment response to the UE, and then transmit a packet by using the HR session.

Specifically, refer to sections such as 4.3.2.2.2 in the 3GPP standard TS 23.502, or a subsequent session establishment manner. This is not limited in this application.

It should be understood that step 501 is not limited to performing a complete HR session establishment procedure. A plurality of steps after step 501 may reuse (or reuse) the HR session establishment procedure; or a plurality of steps after step 501 may be performed in the HR session establishment procedure.

502: The V-SMF sends a session establishment request message to the H-SMF.

In a possible implementation, the HR session establishment procedure is reused, and the V-SMF sends an Nsmf interface PDU session establishment request (Nsmf_PDUSession_Create Request) message to the H-SMF.

It should be understood that the Nsmf_PDUSession_Create Request message is merely an example for description. This is not limited.

503: An H-PCF sends an authorization policy to the H-SMF.

The authorization policy indicates that local traffic routing is allowed in a VPLMN. For the authorization policy, refer to the descriptions of the indication information #A in the foregoing method 300. Details are not described herein again.

In a possible implementation, the HR session establishment procedure is reused, and is implemented by using a session management (session management, SM) policy association procedure. For example, a PDU session establishment procedure or modification procedure may be performed by using SM signaling. In the establishment procedure or the modification procedure according to an SM policy, the H-PCF sends the authorization policy to the H-SMF.

Specifically, in a possible implementation, after receiving the Nsmf_PDUSession_Create Request message, the H-SMF is triggered to select the H-PCF. After the H-PCF is selected, an SM policy association establishment (SM policy association establishment) procedure or SM policy association modification (SM policy association modification) procedure is triggered. In the SM policy association establishment procedure, the H-SMF sends an Npcf interface PDU session SM policy control establishment request (Npcf_SMPolicyControl_Create Request) message to the H-PCF. The message may include one or more of the following: a subscription permanent identifier (subscription permanent identifier, SUPI) or a permanent equipment identifier (permanent equipment identifier, PEI) of the UE, a PDU session identifier, a data network name (data network name, DNN), a single network slice selection assistance information (single network slice selection assistance information, S-NSSAI), a radio access technology (radio access technology, RAT) type, and the like. After receiving the message, the H-PCF determines the authorization policy based on local configuration or subscription information of the UE and/or subscription information of a session that are/is obtained from a UDR, and sends the authorization policy to the H-SMF by using an Npcf interface PDU session SM policy control establishment response (Npcf_SMPolicyControl_Create Response) message. It may be understood that the foregoing descriptions are merely an example for ease of understanding. This is not limited.

It should be noted that the H-SMF may locally configure the authorization policy. In this case, the H-PCF may not send the authorization policy to the H-SMF.

504: The H-SMF selects an H-EASDF.

In a first possible case, if the authorization policy indicates that local traffic routing is allowed in the VPLMN, the H-SMF selects the H-EASDF.

In a second possible case, if the authorization policy indicates that local traffic routing is allowed in the VPLMN, the H-SMF does not select the H-EASDF. Because the H-SMF receives the authorization policy, and learns, based on the authorization policy, that local traffic routing is allowed in the VPLMN, the H-EASDF may not be visible to the UE (to be specific, an address of the H-EASDF may not be sent to the UE). Therefore, an action of selecting the H-EASDF may alternatively be skipped (that is, step 504 is not performed).

It may be understood that both of the foregoing two cases may be implemented. For example, the H-EASDF may be selected or may not be selected based on internal logic or local configurations of the H-SMF. This is not limited.

It should be understood that, if the authorization policy indicates that local traffic routing is not allowed in the VPLMN, the H-SMF may select the H-EASDF, and send address information of the H-EASDF to the UE.

It may be further understood that, for ease of description, FIG. 5 shows only a first possible case, but this embodiment of this application is not limited thereto.

505: The H-SMF sends the authorization policy to the V-SMF.

For example, after receiving the session establishment request message from the V-SMF, the H-SMF sends a session establishment response message to the V-SMF, and includes, in the session establishment response message, the authorization policy received in step 503.

In a possible implementation, the HR session establishment procedure is reused, and the H-SMF sends an Nsmf interface PDU session establishment response (Nsmf_PDUSession_Create Response) message to the V-SMF.

It should be understood that the Nsmf_PDUSession_Create Response message is merely an example for description. This is not limited.

Optionally, if step 504 is performed, that is, the H-SMF selects the H-EASDF, the H-SMF may further send the address information of the H-EASDF to the V-SMF. The address information of the H-EASDF and the authorization policy may be carried in same signaling, or may be carried in two pieces of signaling. This is not limited. In this manner, when the V-SMF fails to select the V-EASDF, it is still possible to send the address of the H-EASDF to the UE, to ensure that an edge service is provided for the UE and improve user experience.

506: The V-SMF selects the V-EASDF according to the authorization policy.

That is, in step 310 in the foregoing method 300, that the first session management network element selects the V-EASDF may include: The first session management network element selects the V-EASDF according to the authorization policy.

After receiving the authorization policy, the V-SMF learns, according to the authorization policy, that local traffic routing is allowed in the VPLMN. Therefore, the V-EASDF may be selected.

A specific manner in which the V-SMF selects the V-EASDF is not limited in this application.

For example, when the V-SMF selects the V-EASDF, reference may be made to one or more pieces of the following information: S-NSSAI, a location of the EASDF, and a DNAI. It may be understood that when the V-SMF selects the V-EASDF, reference may be made to one or more of the foregoing information, or reference may be made to other information that is not listed. This is not limited in this application.

For example, the V-SMF may select the V-EASDF in at least any one of the following manners.

In one manner, the V-SMF may select the V-EASDF based on the local configuration.

In another manner, the V-SMF obtains the V-EASDF from a V-NRF. For example, the V-SMF sends a request message to the V-NRF, and the V-NRF returns information (for example, an address and an identifier) about one or more V-EASDFs to the V-SMF. If the V-NRF returns a plurality of V-EASDFs to the V-SMF, the V-SMF may select one from the V-EASDFs.

It may be understood that a method for the V-SMF to select the V-EASDF may be based on a method for the SMF to select the EASDF in a non-roaming scenario, or a manner for the SMF to select the EASDF in the future. This is not limited.

After completing selecting the V-EASDF, the V-SMF may further send security information to the V-EASDF, to enable the V-EASDF to securely process the DNS message. A specific occasion is not limited. For example, the V-SMF may send the security information to the V-EASDF after step 506 and before step 507.

507: The V-SMF sends the address of the V-EASDF to the UE.

That is, in step 320 in the foregoing method 300, that the first session management network element sends the address information of the V-EASDF may include: The first session management network element sends the address information of the V-EASDF to the UE. Further, that the first session management network element sends the address information of the V-EASDF to the UE may further include: The first session management network element sends the address information of the V-EASDF to the UE according to the authorization policy.

In a possible implementation, the V-SMF sends the address of the V-EASDF to the UE by using the AMF. For example, the V-SMF sends an N1 message (N1 Message) to the UE by using the AMF. The N1 message includes an N1 SM container (container), where the N1 SM container carries the address of the V-EASDF. For example, the V-SMF sends the address of the V-EASDF to the AMF by using an Namf_Communication_N1N2Message Transfer message, and then the AMF sends the address of the V-EASDF to the UE by using a non-access stratum (non-access stratum, NAS) message. The UE and the AMF may interact with each other through an N1 interface, and the interaction message may be referred to as, for example, a NAS message.

508: The UE sends a DNS query to the V-EASDF.

For example, the UE sends the DNS query to the V-EASDF by using a RAN and a UPF through a user plane.

509: The V-EASDF reports, to the V-SMF, a full qualified domain name (full qualified domain name, FQDN) included in the DNS query.

After receiving the DNS query from the UE, the V-EASDF may cache the DNS query, and report, to the V-SMF, the FQDN included in the DNS query.

The V-EASDF may report the FQDN according to a DNS processing rule received from the V-SMF. For example, the DNS processing rule includes an FQDN range. When the V-EASDF receives the DNS query, if the FQDN included in the DNS query matches the FQDN range in the DNS processing rule, the V-EASDF sends the FQDN to the V-SMF, for example, sends the FQDN by using a Neasdf_DNSContext_Notify Request message.

It may be understood that, for a specific procedure of reporting the FQDN, reference may be made to an existing procedure or a manner of reporting the FQDN in the future. This is not limited.

510: The V-SMF sends an ECS option to the V-EASDF.

The ECS option may indicate location information of the UE. After receiving the ECS option, the V-EASDF may add the ECS option to the DNS query.

In this application, the ECS option is mainly used as an example for description. This application is not limited thereto. For example, the ECS option may alternatively be replaced with a local DNS (local DNS, L-DNS) server address.

After adding the ECS option to the DNS query, the V-EASDF sends the DNS query to a DNS server. Further, the DNS server may send a response (response), such as a DNS response, to the V-EASDF. The response may include address information, for example, an EAS IP address or the FQDN. After receiving the DNS response, the V-EASDF may cache the DNS response, and report, to the V-SMF, the address information, for example, the EAS IP address or the FQDN, included in the DNS response. For ease of description, FIG. 5 uses the EAS IP as an example for description.

511: The V-EASDF reports the EAS IP address to the V-SMF.

The V-EASDF may report the EAS IP according to the DNS processing rule received from the V-SMF. For example, the DNS processing rule includes an EAS IP range. When the V-EASDF receives the DNS response, if the EAS IP included in the DNS response matches the EAS IP range in the DNS processing rule, the V-EASDF sends the EAS IP to the V-SMF, for example, sends the EAS IP by using the Neasdf_DNSContext_Notify Request message.

It may be understood that, for a specific procedure of reporting the EAS IP, reference may be made to an existing procedure or a manner of reporting the EAS IP in the future. This is not limited.

512: The V-SMF inserts an uplink classifier (uplink classifier, UL CL) or a branch point (branch point, BP) and an L-PSA.

For example, the V-SMF dynamically inserts the UL CL or the BP, and the L-PSA based on the received EAS IP address.

513: The V-EASDF sends the cached DNS response to the UE.

In a possible implementation, the V-SMF sends indication information to the V-EASDF, where the indication information indicates the V-EASDF to send the cached DNS response to the UE. After receiving the indication from the V-SMF, the V-EASDF sends the cached DNS response to the UE.

Based on the foregoing method 500, when learning, according to the authorization policy, that local traffic routing is allowed in the VPLMN, the V-SMF selects the V-EASDF, and directly sends the address of the V-EASDF to the UE, to implement local traffic routing in the VPLMN in the HR roaming scenario.

Figure 6:
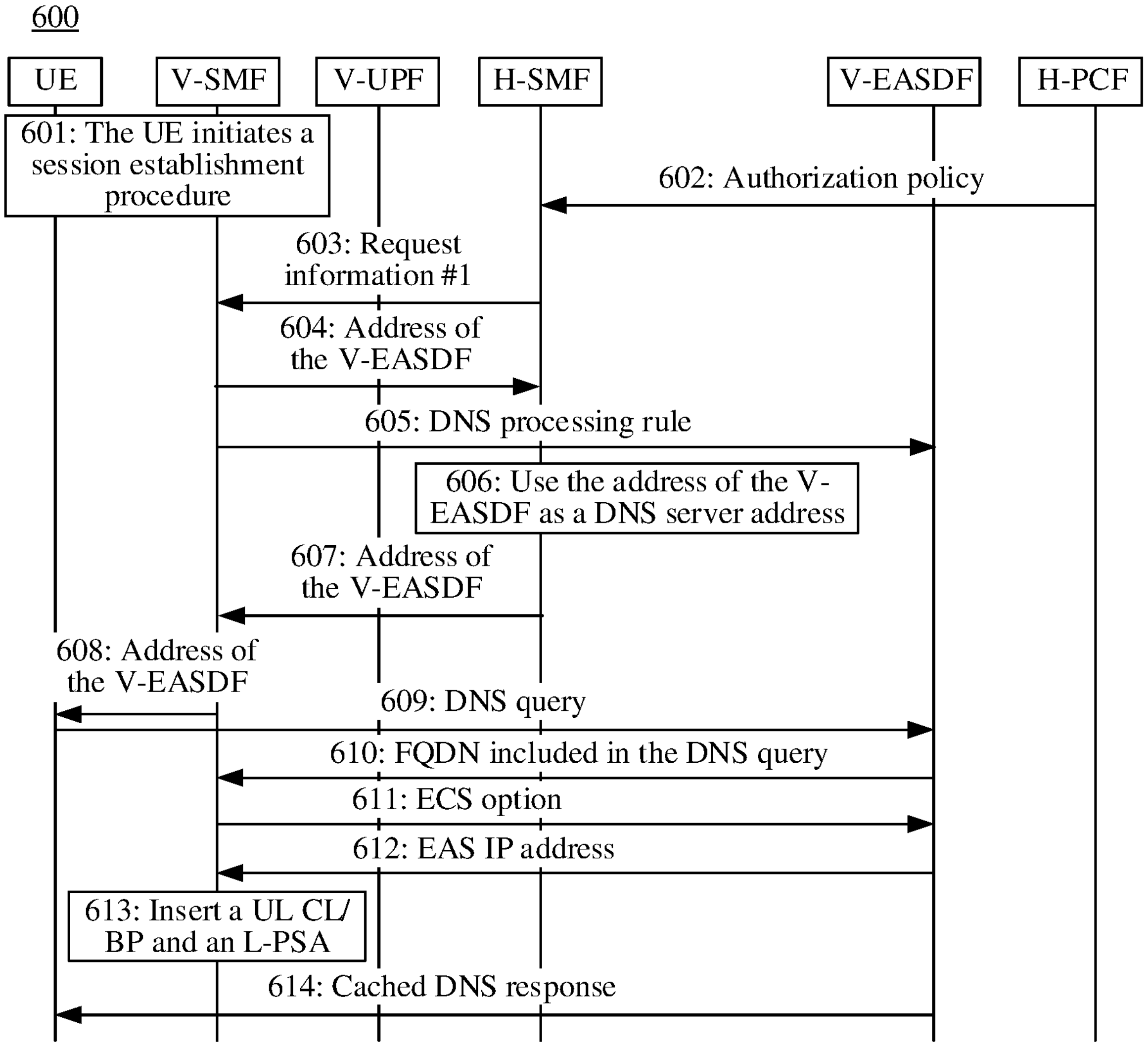
FIG. 6 is a schematic flowchart of another information transmission method 600 according to an embodiment of this application.

FIG. 6 is a schematic flowchart of another information transmission method 600 according to an embodiment of this application. The method 600 may be used in a scenario in which an H-SMF sends an address of a V-EASDF to UE. The method 600 may include the following steps.

601: The UE initiates a session establishment procedure.

Step 601 is similar to step 501. Details are not described herein again.

602: An H-PCF sends an authorization policy to the H-SMF.

Step 602 is similar to step 503. Details are not described herein again.

603: The H-SMF sends request information #1 to a V-SMF.

The request information #1 is used to request (or is used to obtain) the address of the V-EASDF. The implementation of the request information #1 is not limited. For example, the request information #1 may be an authorization policy, that is, the H-SMF sends the authorization policy to the V-SMF, where the authorization policy is used to obtain the address of the V-EASDF. For another example, the request information #1 may be implemented by using one or more bits, and a field of the one or more bits is used to request the address of the V-EASDF.

In a possible implementation, the H-SMF sends an Nsmf interface PDU session context request (Nsmf_PDUSession_Context Request) message to the V-SMF, where the message carries the request information #1.

It should be understood that the Nsmf_PDUSession_Context Request message is merely an example for description. This is not limited.

In a possible case, that the H-SMF sends the request information #1 to the V-SMF includes: The H-SMF sends the request information #1 to the V-SMF according to the authorization policy. Specifically, if the authorization policy indicates that local traffic routing is allowed in a VPLMN, the H-SMF sends the request information #1 to the V-SMF. In this case, that the second session management network element obtains the address information of the V-EASDF in step 410 in the foregoing method 400 may include: The second session management network element obtains the address information of the V-EASDF according to the authorization policy.

604: The V-SMF sends the address of the V-EASDF to the H-SMF.

That is, that the second session management network element obtains the address information of the V-EASDF in step 410 in the foregoing method 400 may include: The second session management network element receives the address information of the V-EASDF from the V-SMF.

For example, the V-SMF selects the V-EASDF based on the request information #1 received in step 603, and returns the address of the V-EASDF to the H-SMF. For a manner in which the V-SMF selects the V-EASDF, refer to the descriptions of step 506 in the method 500. Details are not described herein again.

In a possible implementation, the V-SMF sends an Nsmf interface PDU session context response (Nsmf_PDUSession_Context Response) message to the H-SMF, where the message carries the address of the V-EASDF.

After completing selecting the V-EASDF, the V-SMF may further send security information to the V-EASDF, to enable the V-EASDF to securely process a DNS message. A specific occasion is not limited. For example, the V-SMF may send the security information to the V-EASDF after step 604 and before step 608.

605: The V-SMF sends a DNS processing rule to the V-EASDF.

The DNS processing rule may include, for example, an FQDN range of the VPLMN. The FQDN range may include: an FQDN range in which an edge service is deployed in the VPLMN, and/or an FQDN range in which traffic routing is expected in the VPLMN. If the V-EASDF receives a DNS query that matches the FQDN range, the V-EASDF reports the DNS query to the V-SMF.

606: The H-SMF uses the address of the V-EASDF as a DNS server address.

The H-SMF uses the address of the V-EASDF received in step 604 as the DNS server address, and then sends the address to the UE.

607: The H-SMF sends the address of the V-EASDF to the V-SMF.

In the method 600, the H-SMF may send the address of the V-EASDF to the UE by using the V-SMF. That is, in step 420 in the foregoing method 400, that the second session management network element sends the address information of the V-EASDF to the terminal device may include: The second session management network element sends the address information of the V-EASDF to the terminal device by using the V-SMF.

In a possible implementation, an HR session establishment procedure is reused, and the H-SMF sends an Nsmf_PDUSession_Create Response message to the V-SMF, where the Nsmf_PDUSession_Create Response message carries the address of the V-EASDF.

It should be understood that the Nsmf_PDUSession_Create Response message is merely an example for description. This is not limited.

608: The V-SMF sends the address of the V-EASDF to the UE.

After receiving the address of the V-EASDF from the H-SMF, the V-SMF may not need to parse the address, that is, forward the address of the V-EASDF to the UE.

In a possible implementation, the V-SMF sends the address of the V-EASDF to the UE by using an AMF. For example, the V-SMF sends an N1 SM container to the UE by using the AMF, where the N1 SM container carries the address of the V-EASDF.

609: The UE sends the DNS query to the V-EASDF.

610: The V-EASDF reports, to the V-SMF, an FQDN included in the DNS query.

611: The V-SMF sends an ECS option to the V-EASDF.

612: The V-EASDF reports an EAS IP address to the V-SMF.

613: The V-SMF inserts a UL CL/BP and an L-PSA.

614: The V-EASDF sends a cached DNS response to the UE.

Steps 609 to 614 are similar to steps 508 to 513. Details are not described herein again.

Based on the foregoing method 600, when learning, according to the authorization policy, that local traffic routing is allowed in the VPLMN, the H-SMF requests the address of the V-EASDF from the V-SMF, and sends the address of the V-EASDF to the UE, to implement local traffic routing in the VPLMN in an HR roaming scenario.

Figure 7:
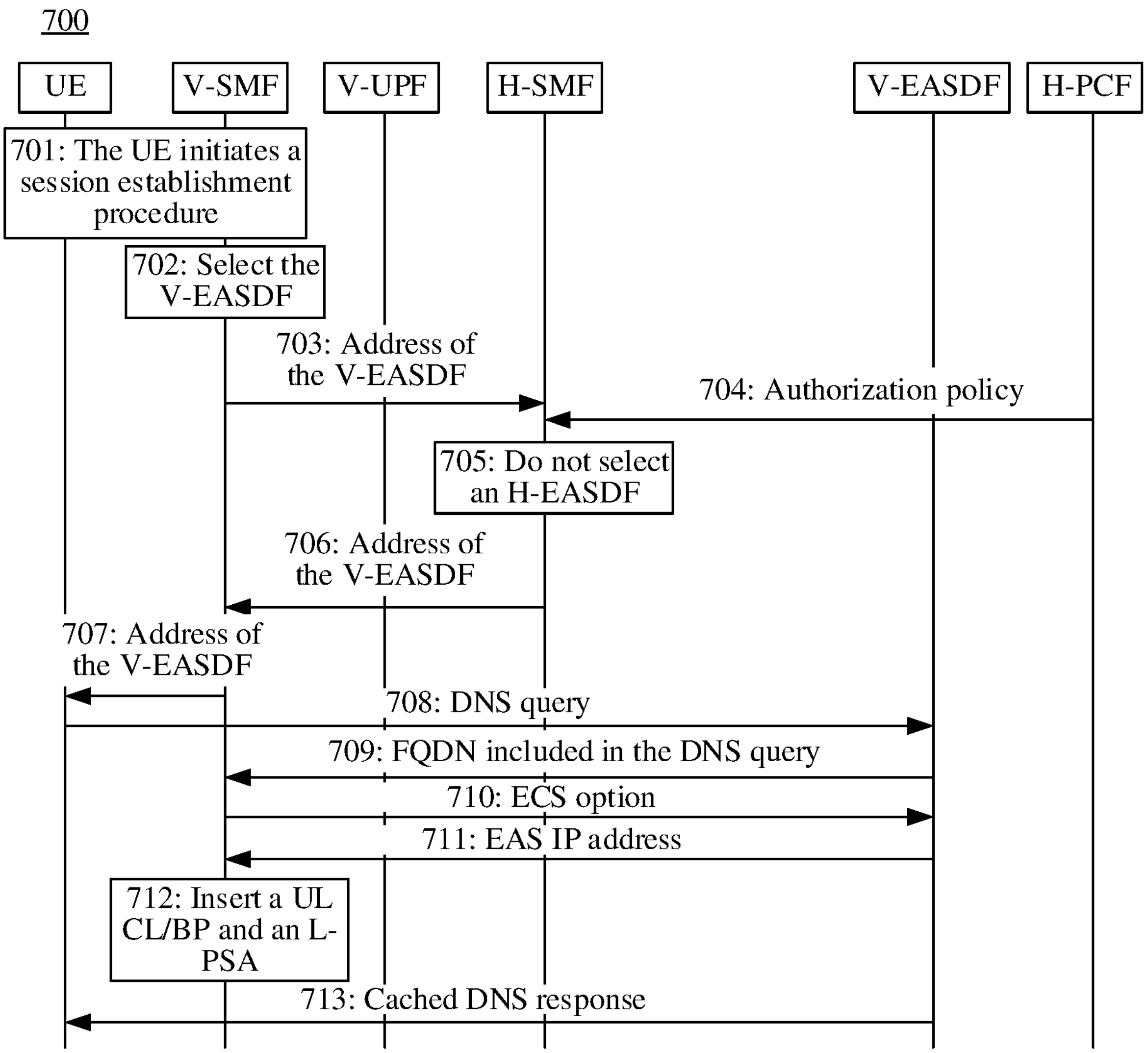
FIG. 7 is a schematic flowchart of another information transmission method 700 according to an embodiment of this application.

FIG. 7 is a schematic flowchart of another information transmission method 700 according to an embodiment of this application. The method 700 may be used in a scenario in which an H-SMF sends an address of a V-EASDF to UE. The method 700 may include the following steps.

701: The UE initiates a session establishment procedure.

Step 701 is similar to step 501. Details are not described herein again.

702: A V-SMF selects the V-EASDF.

For a manner in which the V-SMF selects the V-EASDF, refer to the descriptions of step 506 in the method 500. Details are not described herein again.

703: The V-SMF sends the address of the V-EASDF to the H-SMF.

That is, that the second session management network element obtains the address information of the V-EASDF in step 410 in the foregoing method 400 may include: The second session management network element receives the address information of the V-EASDF from the V-SMF.

In a possible implementation, an HR session establishment procedure is reused, and the V-SMF sends an Nsmf_PDUSession_Create Request message to the H-SMF, where the message carries the address of the V-EASDF.

After completing selecting the V-EASDF, the V-SMF may send security information to the V-EASDF, to enable the V-EASDF to securely process the DNS message. A specific occasion is not limited. For example, the V-SMF may send the security information to the V-EASDF after step 702 and before step 707.

704: The H-PCF sends an authorization policy to the H-SMF.

The authorization policy indicates that local traffic routing is allowed in a VPLMN.

Step 704 is similar to step 503. Details are not described herein again.

705: The H-SMF does not select an H-EASDF.

Because the H-SMF receives the address of the V-EASDF in step 703, and learns, according to the authorization policy received in step 704, that local traffic routing is allowed in the VPLMN, the H-SMF may send the address of the V-EASDF as a DNS server address to the UE, and thus may not select the H-EASDF.

706: The H-SMF sends the address of the V-EASDF to the V-SMF.

In the method 700, the H-SMF may send the address of the V-EASDF to the UE by using the V-SMF. That is, in step 420 in the foregoing method 400, that the second session management network element sends the address information of the V-EASDF to the terminal device may include: The second session management network element sends the address information of the V-EASDF to the terminal device by using the V-SMF.

In addition, that the H-SMF sends the address of the V-EASDF to the V-SMF may include: The H-SMF sends the address of the V-EASDF to the V-SMF according to the authorization policy. Specifically, if the authorization policy indicates that local traffic routing is allowed in the VPLMN, the H-SMF may send the address of the V-EASDF to the UE by using the V-SMF. That is, in step 420 in the foregoing method 400, that the second session management network element sends the address information of the V-EASDF to the terminal device may include: The second session management network element sends the address information of the V-EASDF to the terminal device according to the authorization policy.

707: The V-SMF sends the address of the V-EASDF to the UE.

Step 707 is similar to step 608. Details are not described herein again.

708: The UE sends a DNS query to the V-EASDF.

709: The V-EASDF reports, to the V-SMF, an FQDN included in the DNS query.

710: The V-SMF sends an ECS option to the V-EASDF.

711: The V-EASDF reports an EAS IP address to the V-SMF.

712: The V-SMF inserts a UL CL/BP and an L-PSA.

713: The V-EASDF sends a cached DNS response to the UE.

Steps 708 to 713 are similar to steps 508 to 513. Details are not described herein again.

Based on the foregoing method 700, the V-SMF sends the address of the V-EASDF to the H-SMF, and the H-SMF sends the address of the V-EASDF as the DNS server address to the UE, to implement local traffic routing in the VPLMN in an HR roaming scenario.

Figure 8:
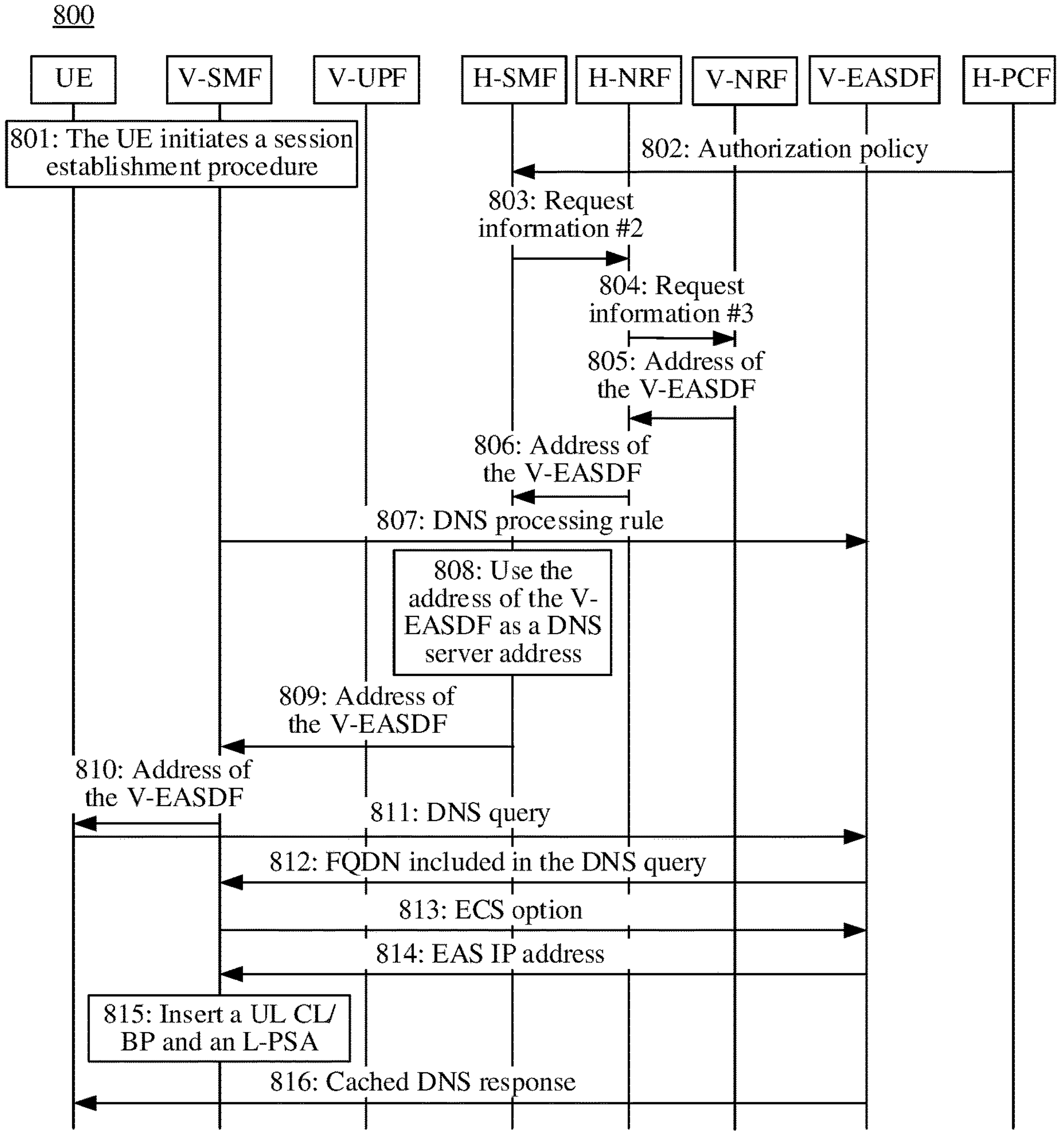
FIG. 8 is a schematic flowchart of another information transmission method 800 according to an embodiment of this application.

FIG. 8 is a schematic flowchart of another information transmission method 800 according to an embodiment of this application. The method 800 may be used in a scenario in which an H-SMF sends an address of a V-EASDF to UE. The method 800 may include the following steps.

801: The UE initiates a session establishment procedure.

Step 801 is similar to step 501. Details are not described herein again.

802: An H-PCF sends an authorization policy to the H-SMF.

The authorization policy indicates that local traffic routing is allowed in a VPLMN.

Step 802 is similar to step 503. Details are not described herein again.

803: The H-SMF sends request information #2 to an H-NRF.

The request information #2 is used to request (or is used to obtain) an address of the V-EASDF. A form of the request information #2 is not limited. For example, the request information #2 may be implemented by using one or more bits, and a field of the one or more bits is used to request the address of the V-EASDF.

In a first possible case, after receiving the request information #2, the H-NRF may determine the address of the V-EASDF based on local configurations. In this case, the H-NRF directly sends a response of the request information #2 to the H-SMF, where the response carries the address of the V-EASDF. That is, steps 804 and 805 may not be performed.

In a second possible case, after receiving the request information #2, the H-NRF may receive the address of the V-EASDF from a V-NRF. In this case, the method 800 may include steps 804 and 805.

804: The H-NRF sends request information #3 to the V-NRF.

The request information #3 is used to request (or is used to obtain) the address of the V-EASDF. A form of the request information #3 is not limited. For example, the request information #3 may be implemented by using one or more bits, and a field of the one or more bits is used to request the address of the V-EASDF.

805: The V-NRF sends the address of the V-EASDF to the H-NRF.

In a first possible case, if the V-NRF stores the address of the V-EASDF, the V-NRF sends the address of the V-EASDF to the H-NRF based on the request of the H-NRF.

In a second possible case, if the V-NRF does not store the address of the V-EASDF, the V-NRF may request the address of the V-EASDF from the V-SMF. The V-SMF selects the V-EASDF based on the request, and returns the address of the V-EASDF to the V-NRF. After receiving the address of the V-EASDF, the V-NRF sends the address of the V-EASDF to the H-NRF.

Further, the H-NRF sends the address of the V-EASDF to the H-SMF. That is, in step 410 in the foregoing method 400, that the second session management network element obtains the address information of the V-EASDF includes: The second session management network element receives the address information of the V-EASDF from the H-NRF.

806: The H-NRF sends the address of the V-EASDF to the H-SMF.

In a first possible case, if the H-NRF determines the address of the V-EASDF based on the local configurations in step 803, the address of the V-EASDF that is sent by the H-NRF to the H-SMF in step 806 is the address of the V-EASDF that is determined by the H-NRF based on the local configurations in step 803.

In a second possible case, if steps 804 and 805 are performed, the address of the V-EASDF that is sent by the H-NRF to the H-SMF in step 806 is the address of the V-EASDF that is received by the H-NRF from the V-NRF in step 805.

In a third possible case, if the H-NRF locally configures the address of the V-EASDF in step 803, and steps 804 and 805 are performed, to be specific, the H-NRF receives the address of the V-EASDF from the V-NRF, the address of the V-EASDF that is sent by the H-NRF to the H-SMF in step 806 may be locally configured or received. In this case, the address of the V-EASDF that is sent by the H-NRF to the H-SMF in step 806 may be the address of the V-EASDF that is received by the H-NRF from the V-NRF.

807: The V-SMF sends a DNS processing rule to the V-EASDF.

808: The H-SMF uses the address of the V-EASDF as a DNS server address.

809: The H-SMF sends the address of the V-EASDF to the V-SMF.

810: The V-SMF sends the address of the V-EASDF to the UE.

After receiving the address of the V-EASDF from the H-SMF, the V-SMF may not need to parse the address, that is, forward the address of the V-EASDF to the UE.

In a possible implementation, the V-SMF sends the address of the V-EASDF to the UE by using an AMF. For example, the V-SMF sends an N1 SM container to the UE by using the AMF, where the N1 SM container carries the address of the V-EASDF.

811: The UE sends a DNS query to the V-EASDF.

812: The V-EASDF reports, to the V-SMF, an FQDN included in the DNS query.

813: The V-SMF sends an ECS option to the V-EASDF.

814: The V-EASDF reports an EAS IP address to the V-SMF.

815: The V-SMF inserts a UL CL/BP and an L-PSA.

816: The V-EASDF sends a cached DNS response to the UE.

Steps 807 to 816 are similar to steps 605 to 614. Details are not described herein again.

Based on the method 800, the H-SMF requests the address of the V-EASDF from the H-NRF according to the authorization policy. The H-NRF requests the address of the V-EASDF from the V-NRF, and after obtaining the address of the V-EASDF, sends the address of the V-EASDF to the H-SMF, and then the H-SMF sends the address of the V-EASDF to the UE, to implement local traffic routing in the VPLMN in an HR roaming scenario.

It may be understood that examples in FIG. 5 to FIG. 8 in embodiments of this application are provided merely to help a person skilled in the art understand embodiments of this application, instead of limiting embodiments of this application to specific scenarios shown in the examples. It is clear that, a person skilled in the art can make various equivalent modifications or changes based on the examples in FIG. 5 to FIG. 8, and such modifications or changes also fall within the scope of embodiments of this application. For example, the session establishment procedure in FIG. 5 to FIG. 8 may alternatively be replaced with a session modification procedure. For another example, the ECS option in FIG. 5 to FIG. 8 may alternatively be replaced with an L-DNS server address.

It may be further understood that, in some of the foregoing embodiments, message names such as the Nsmf_PDUSession_Update Request message and Nsmf_PDUSession_Context Request message are merely examples, and do not limit the protection scope of embodiments of this application.

It may be further understood that, from the perspective of the architecture, the V-EASDF and the V-UPF may be integrated. In this deployment scenario, the VPLMN only needs to obtain the authorization policy indicating that local traffic routing is allowed in the VPLMN. In this case, the V-UPF distributes some DNS queries to the L-DNS for processing and distributes remaining DNS queries to the HPLMN. Alternatively, the V-EASDF and the V-UPF may be separately disposed. In this deployment scenario, local traffic routing in the VPLMN may be implemented based on the foregoing embodiment.

It may be further understood that some optional features in embodiments of this application may not depend on another feature in some scenarios, or may be combined with another feature in some scenarios. This is not limited.

It should be understood that the solutions in embodiments of this application may be properly combined for use, and explanations or descriptions of terms in embodiments may be cross-referenced or explained in embodiments. This is not limited.

It may be further understood that values of various numeric sequence numbers in embodiments of this application do not mean execution sequences, merely for differentiation for ease of description, and should not constitute any limitation on an implementation process of embodiments of this application.

It may be further understood that some message names in embodiments of this application do not limit the protection scope of embodiments of this application.

It may be further understood that in the foregoing method embodiments, methods and operations implemented by a device may alternatively be implemented by a component (for example, a chip or a circuit) of the device.

Corresponding to the methods provided in the foregoing method embodiments, an embodiment of this application further provides a corresponding apparatus. The apparatus includes corresponding modules configured to perform the foregoing method embodiments. The module may be software, hardware, or a combination of software and hardware. It may be understood that the technical features described in the method embodiments are also applicable to the following apparatus embodiments.

Figure 9:
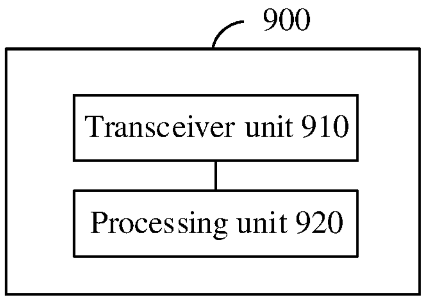
FIG. 9 is a schematic block diagram of an information transmission apparatus 900 according to an embodiment of this application.

FIG. 9 is a schematic block diagram of a transmission mode switching apparatus according to an embodiment of this application. The apparatus 900 includes a transceiver unit 910 and a processing unit 920. The transceiver unit 910 may be configured to implement a corresponding communication function. The transceiver unit 910 may also be referred to as a communication interface or a communication unit. The processing unit 920 may be configured to implement a corresponding processing function, for example, select an edge application server discovery network element.

Optionally, the apparatus 900 may further include a storage unit. The storage unit may be configured to store instructions and/or data. The processing unit 920 may read the instructions and/or the data in the storage unit, so that the apparatus implements actions of the devices or network elements in the foregoing method embodiments.

In a first design, the apparatus 900 may be the first session management network element in the foregoing embodiments, or may be a component (for example, a chip) of the first session management network element. The apparatus 900 may implement steps or procedures performed by the first session management network element in the foregoing method embodiments. The transceiver unit 910 may be configured to perform sending and receiving operations of the first session management network element in the foregoing method embodiments. The processing unit 920 may be configured to perform operations related to processing of the first session management network element in the foregoing method embodiments.

In a possible implementation, the processing unit 920 is configured to select an edge application server discovery network element, where the first session management network element and the edge application server discovery network element are network elements deployed in a visited network. The transceiver unit 910 is configured to send address information of the edge application server discovery network element.

For example, the processing unit 920 is configured to select the edge application server discovery network element based on indication information, where the indication information indicates that traffic routing is allowed in the visited network.

Optionally, the transceiver unit 910 is further configured to receive the indication information from a second session management network element, where the second session management network element is a network element deployed in a home network.

Optionally, the first session management network element locally configures the indication information.

Optionally, the transceiver unit 910 is further configured to send the address information of the edge application server discovery network element to a terminal device.

For example, the transceiver unit 910 is configured to send the address information of the edge application server discovery network element to the second session management network element, where the second session management network element is the network element deployed in the home network.

Optionally, the transceiver unit 910 is further configured to receive request information from the second session management network element, where the request information is used to request an address of the edge application server discovery network element, and the second session management network element is the network element deployed in the home network. The processing unit 920 is used by the first session management network element to: in response to the request information, select the edge application server discovery network element.

In a second design, the apparatus 900 may be the second session management network element in the foregoing embodiments, or may be a component (for example, a chip) of the second session management network element. The apparatus 900 may implement steps or procedures performed by the second session management network element in the foregoing method embodiments. The transceiver unit 910 is configured to perform sending and receiving operations of the second session management network element in the foregoing method embodiments. The processing unit 920 is configured to perform processing operations of the second session management network element in the foregoing method embodiments.

In a possible implementation, the transceiver unit 910 is configured to: obtain address information of an edge application server discovery network element, and send the address information of the edge application server discovery network element to a terminal device, where the edge application server discovery network element is a network element deployed in a visited network, and the second session management network element is a network element deployed in a home network.

For example, the transceiver unit 910 is configured to receive the address information of the edge application server discovery network element from a first session management network element, where the first session management network element is a network element deployed in the visited network.

For example, the transceiver unit 910 is configured to send first request information to the first session management network element, where the first request information is used to request an address of the edge application server discovery network element.

Optionally, the transceiver unit 910 is further configured to send second request information to a network repository network element, where the second request information includes an identifier of the visited network, the second request information is used to request an address of the edge application server discovery network element, and the network repository network element is a network element deployed in the home network. The transceiver unit 910 is configured to receive the address information of the edge application server discovery network element from the network repository network element.

Optionally, the transceiver unit 910 is further configured to obtain indication information, where the indication information indicates that traffic routing is allowed in the visited network. The transceiver unit 910 is configured to obtain the address information of the edge application server discovery network element based on the indication information.

Optionally, the transceiver unit 910 is further configured to obtain indication information, where the indication information indicates that traffic routing is allowed in the visited network. The transceiver unit 910 is configured to send the address information of the edge application server discovery network element to the terminal device based on the indication information.

Optionally, the transceiver unit 910 is further configured to send the indication information to the first session management network element.

Optionally, the transceiver unit 910 is further configured to receive the indication information from a policy control network element, where the policy control network element is a network element deployed in the home network.

For example, the second session management network element locally configures the indication information.

It should be understood that a specific process in which the units perform the foregoing corresponding steps is described in detail in the foregoing method embodiments. For brevity, details are not described herein again.

It should be further understood that the apparatus 900 herein is embodied in a form of a functional unit. The term "unit" herein may be an application-specific integrated circuit (application-specific integrated circuit, ASIC), an electronic circuit, a processor (for example, a shared processor, a dedicated processor, or a group processor) configured to execute one or more software or firmware programs, a memory, a merge logic circuit, and/or another appropriate component that supports the described function. In an optional example, a person skilled in the art may understand that the apparatus 900 may be specifically the first session management network element in the foregoing method embodiments, and may be configured to perform a procedure and/or a step corresponding to the first session management network element in the foregoing method embodiments, or the apparatus 900 may be specifically the second session management network element in the foregoing embodiments, and may be configured to perform a procedure and/or a step corresponding to the second session management network element in the foregoing embodiments. To avoid repetition, details are not described herein again.

The apparatus 900 in each of the foregoing solutions has a function of implementing corresponding steps performed by a core network element (for example, the first session management network element or the second session management network element) in the foregoing methods. The function may be implemented by hardware, or may be implemented by hardware executing corresponding software. The hardware or software includes one or more modules corresponding to the foregoing functions. For example, a transceiver unit may be replaced with a transceiver (for example, a sending unit in the transceiver unit may be replaced with a transmitter, and a receiving unit in the transceiver unit may be replaced with a receiver), and another unit, such as a processing unit, may be replaced with a processor, to separately perform sending and receiving operations and a related processing operation in the method embodiments.

In addition, the transceiver unit 910 may alternatively be a transceiver circuit (for example, may include a receive circuit and a transmit circuit), and the processing unit may be a processing circuit.

It should be noted that the apparatus in FIG. 9 may be the network element or the device in the foregoing embodiments, or may be a chip or a chip system, for example, a system on chip (system on chip, SoC). The transceiver unit may be an input/output circuit, or a communication interface. The processing unit is a processor, a microprocessor, or an integrated circuit integrated on the chip. This is not limited herein.

Figure 10:
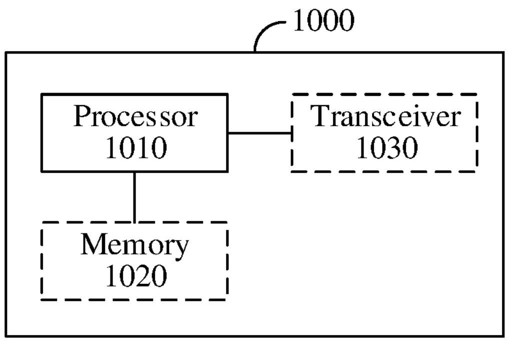
FIG. 10 is a schematic block diagram of another information transmission apparatus 1000 according to an embodiment of this application.

As shown in FIG. 10, an embodiment of this application provides another information transmission apparatus 1000. The apparatus 1000 includes a processor 1010. The processor 1010 is configured to: execute a computer program or instructions stored in the memory 1020, or read data/signaling stored in the memory 1020, to perform the methods in the foregoing method embodiments. Optionally, there are one or more processors 1010.

Optionally, as shown in FIG. 10, the apparatus 1000 further includes the memory 1020. The memory 1020 is configured to store the computer program or the instructions and/or the data. The memory 1020 may be integrated with the processor 1010, or may be disposed separately. Optionally, there are one or more memories 1020.

Optionally, as shown in FIG. 10, the apparatus 1000 further includes a transceiver 1030. The transceiver 1030 is configured to receive and/or send a signal. For example, the processor 1010 is configured to control the transceiver 1030 to receive and/or send the signal.

In a solution, the apparatus 1000 is configured to implement operations performed by the core network element in the foregoing method embodiments.

For example, the processor 1010 is configured to execute the computer program or the instructions stored in the memory 1020, to implement related operations of the first session management network element in the foregoing method embodiments. For example, the method performed by the first session management network element in the embodiment shown in FIG. 3 or FIG. 4 is implemented, or the method performed by the V-SMF in any one of embodiments shown in FIG. 5 to FIG. 8 is implemented.

For another example, the processor 1010 is configured to execute the computer program or the instructions stored in the memory 1020, to implement related operations of the second session management network element in the foregoing method embodiments. For example, the method performed by the second session management network element in the embodiment shown in FIG. 3 or FIG. 4 is implemented, or the method performed by the H-SMF in any one of embodiments shown in FIG. 5 to FIG. 8 is implemented.

It should be understood that, the processor mentioned in embodiments of this application may be a central processing module (central processing unit, CPU), and may alternatively be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor, or the like.

It should be further understood that the memory mentioned in embodiments of this application may be a volatile memory and/or a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. By way of example and not limitation, the RAM includes the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that, when the processor is a general-purpose processor, a DSP, an ASIC, an FPGA, or another programmable logic device, a discrete gate or a transistor logic device, or a discrete hardware component, the memory (a storage module) may be integrated into the processor.

It should be further understood that, the memory described in this specification is intended to include but is not limited to these memories and any other memory of a proper type.

An embodiment of this application further provides a computer-readable storage medium. The computer-readable storage medium stores computer instructions used to implement the method performed by the core network element in the foregoing method embodiments.

For example, when a computer program is executed by a computer, the computer is enabled to implement the method performed by the first session management network element or the method performed by the second session management network element in the foregoing method embodiments.

An embodiment of this application further provides a computer program product including instructions. When the instructions are executed by a computer, the computer is enabled to implement the method performed by the core network element in the foregoing method embodiments.

An embodiment of this application further provides an information transmission system, including one or more of the foregoing first session management network element, the second session management network element, the network repository network element, and the policy control network element.

For explanations and beneficial effects of related content in any apparatus provided above, refer to the corresponding method embodiment provided above. Details are not described herein again.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in an electronic form, a mechanical form, or another form.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of procedures or functions according to embodiments of this application are generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by the computer, or a data storage device such as a server or a data center that integrates one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. For example, the foregoing usable medium includes but is not limited to any medium that can store program code, such as a USB flash drive, a removable hard disk, a read-only memory (read-only memory, ROM), a random access memory (random access memory, RAM), a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for information transmission, comprising:

selecting, by a first session management network element in a visited network, an edge application server discovery network element in the visited network; and sending, by the first session management network element, address information of the edge application server discovery network element to a second session management network element in a home network.

2. The method according to claim 1, wherein selecting, by the first session management network element, the edge application server discovery network element comprises:

selecting, by the first session management network element, the edge application server discovery network element in response to indication information, wherein the indication information indicates that local traffic routing is allowed in the visited network.

3. The method according to claim 2, wherein sending, by the first session management network element, the address information of the edge application server discovery network element to the second session management network element comprises:

sending, by the first session management network element in response to the indication information, the address information of the edge application server discovery network element to the second session management network element.

4. The method according to claim 2, wherein the method further comprises:

receiving, by the first session management network element, the indication information from a network element deployed in the home network.

5. The method according to claim 1, wherein the method is applied to a home routed roaming scenario.

6. A method for information transmission, comprising:

receiving, from a first session management network element in a visited network by a second session management network element in a home network, address information of an edge application server discovery network element in the visited network; and sending, by the second session management network element, the address information of the edge application server discovery network element to a terminal device.

7. The method according to claim 6, wherein the method further comprises:

obtaining, by the second session management network element, indication information, wherein the indication information indicates that local traffic routing is authorized in the visited network; and wherein obtaining, by the second session management network element, the address information of the edge application server discovery network element comprises:

obtaining, by the second session management network element, the address information of the edge application server discovery network element in response to the indication information.

8. The method according to claim 6, wherein the method further comprises:

obtaining, by the second session management network element, indication information, wherein the indication information indicates that local traffic routing is authorized in the visited network; and wherein sending, by the second session management network element, the address information of the edge application server discovery network element to the terminal device comprises:

sending, by the second session management network element, the address information of the edge application server discovery network element to the terminal device in response to the indication information.

9. The method according to claim 8, wherein obtaining the indication information comprises:

receiving, by the second session management network element, the indication information from a network element deployed in the home network; or locally configuring, by the second session management network element, the indication information.

10. The method according to claim 6, wherein the method is applied to a home routed roaming scenario.

11. An apparatus in a visited network, comprising:

at least one processor; and at least one memory coupled to the at least one processor and storing programming instructions that, when executed by the at least one processor, cause the apparatus to:

select an edge application server discovery network element in the visited network; and send address information of the edge application server discovery network element to a second session management network element in a home network.

12. The apparatus according to claim 11, wherein the edge application server discovery network element is selected in response to indication information, and wherein the indication information indicates that local traffic routing is allowed in the visited network.

13. The apparatus according to claim 12, wherein the address information of the edge application server discovery network element is sent in response to the indication information.

14. The apparatus according to claim 12, wherein the programming instructions, when executed by the at least one processor, cause the apparatus to:

receive the indication information from a network element deployed in the home network.

15. The apparatus according to claim 11, wherein the apparatus is applied to a home routed roaming scenario.

16. An apparatus in a home network, comprising:

at least one processor; and at least one memory coupled to the at least one processor and storing programming instructions that, when executed by the at least one processor, cause the apparatus to:

receive, from a first session management network element in a visited network, address information of an edge application server discovery network element in the visited network; and send the address information of the edge application server discovery network element to a terminal device.

17. The apparatus according to claim 16, wherein the programming instructions, when executed by the at least one processor, cause the apparatus to:

obtain indication information, wherein the indication information indicates that local traffic routing is authorized in the visited network; and wherein the address information of the edge application server discovery network element is received in response to the indication information.

18. The apparatus according to claim 16, wherein the programming instructions, when executed by the at least one processor, cause the apparatus to:

obtain indication information, wherein the indication information indicates that local traffic routing is authorized in the visited network; and wherein the address information of the edge application server discovery network element is sent to the terminal device in response to the indication information.

19. The apparatus according to claim 18, wherein the indication information is obtained by:

receiving the indication information from a network element deployed in the home network; or locally configuring the indication information.

20. The apparatus according to claim 16, wherein the apparatus is applied to a home routed roaming scenario.

* * * * *